United States Patent [19]

Mithuhira et al.

[11] 4,449,664

[45] May 22, 1984

[54] AIR QUANTITY REGULATING APPARATUS FOR AIR CONDITIONING

[75] Inventors: Kuniaki Mithuhira, Higashi-Hiroshima; Keiji Kamata, Yamato; Hikoshiro Suzuki, Sagamihara, all of Japan

[73] Assignee: Topre Corporation, Tokyo, Japan

[21] Appl. No.: 459,255

[22] Filed: Jan. 19, 1983

Related U.S. Application Data

[63] Continuation-in-part of Ser. No. 275,650, Jun. 22, 1981, abandoned.

[30] Foreign Application Priority Data

Jun. 27, 1980 [JP] Japan .................................. 55-90998

[51] Int. Cl.³ .............................................. F24F 13/10
[52] U.S. Cl. .................................... 236/49; 73/861.78; 137/486; 340/610
[58] Field of Search ............... 236/49; 137/486, 487.5; 73/861.78; 340/606, 610, 615

[56] References Cited

U.S. PATENT DOCUMENTS

| | | | |
|---|---|---|---|
| 3,164,020 | 1/1965 | Groner et al. | 73/861.78 |
| 3,177,711 | 4/1965 | Ham et al. | 73/861.78 |
| 3,372,591 | 3/1968 | Clinton et al. | 73/861.78 |
| 3,610,039 | 10/1971 | Althouse et al. | 340/606 X |
| 3,690,548 | 9/1972 | McNabney | 236/1 C |
| 3,776,265 | 12/1973 | O'Connor, Jr. | 137/487.5 |
| 3,941,310 | 3/1976 | Travaglio et al. | 236/49 |
| 3,945,565 | 3/1976 | Lynch et al. | 236/49 |
| 4,101,874 | 7/1978 | Denison et al. | 340/606 |
| 4,147,298 | 4/1979 | Leemhuis | 236/49 |
| 4,265,127 | 5/1981 | Onoda | 73/861.78 |

*Primary Examiner*—William E. Tapolcai
*Attorney, Agent, or Firm*—Oblon, Fisher, Spivak, McClelland & Maier

[57] ABSTRACT

An air quantity regulating apparatus for air conditioning according to the present invention has two functions one of which is a constant air quantity function and the other is a variable air quantity function in cooperation with a room thermostat. When a constant air quantity control switch is turned on, the apparatus serves as the constant air quantity apparatus, on the other hand when the switch is turned off, the apparatus serves as the variable air quantity apparatus.

9 Claims, 40 Drawing Figures

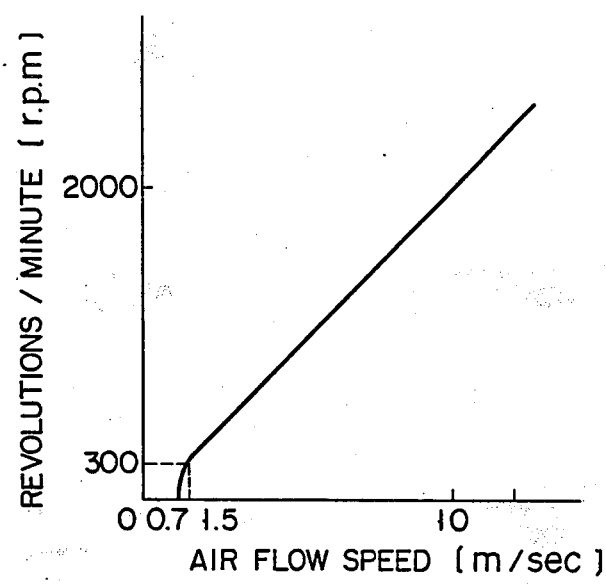
F I G. 7
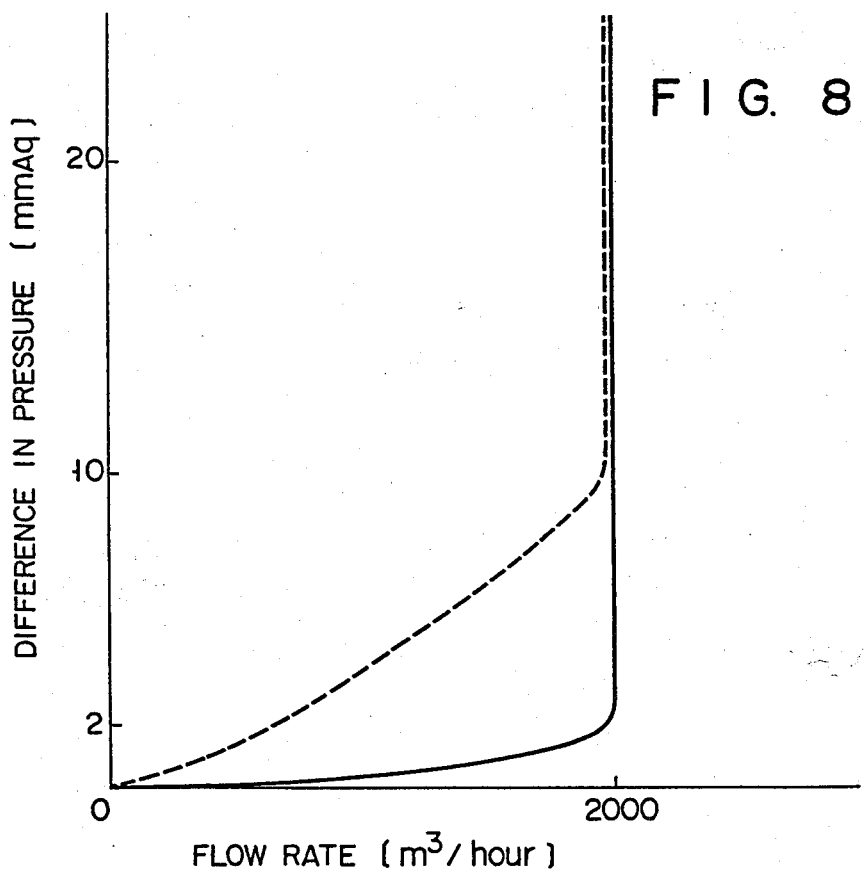
F I G. 8

OUTPUT OF REVOLUTION
SENSOR 32

INPUT OF INV.
INPUT OF OP AMP. 1021

OUTPUT OF OP AMP 1021

INPUT OF IC 1041

OUTPUT OF IC 1041

AIR QUANTITY REGULATING APPARATUS FOR AIR CONDITIONING

CROSS REFERENCE TO THE RELATED APPLICATION

This application is a continuation-in-part of application Ser. No. 275,650, filed on June 22, 1981, and now abandoned.

BACKGROUND OF THE INVENTION

The present invention relates to an air quantity regulating apparatus for air conditioning and, more particularly, to an air quantity regulating apparatus disposed in the vicinity of a supply opening of a zone in an air conditioning system for supplying conditioned air to a plurality of zones from a single air conditioner through a duct.

In an air conditioning system of the type described above, pressure loss of air from the air conditioner to the zones is not constant. An air quantity regulating apparatus disposed in the vicinity of the supply opening of each zone changes the quantity of air so as to regulate a zone temperature in response to a room thermostat signal, thereby changing the pressure in the duct which supplies the air. The air quantities at all supply openings are influenced by the difference between pressures at various locations in the duct and by a change or fluctuation in the pressure at a single location in the duct. This impedes the designed distribution and regulation of the air quantity. Since the system described above is used to regulate room temperature by air, a minimum ventilating quantity must be assured independently of room temperature, and the concentration of hazardous gases such as $CO_2$ and $CO$ must be kept within the rated standards. Furthermore, along with air conditioning, heating and cooling must be equally performed.

A room thermostat generally produces an output in response to a difference between the preset thermostat temperature and the actual room temperature. When the room temperature is higher than the preset temperature in the cooling mode, the air quantity regulating apparatus must serve to increase the air quantity currently supplied and to lower the room temperature. However, in the heating mode, the air quantity regulating apparatus must serve to decrease the air quantity and to lower the room temperature under the same conditions as in the cooling mode. Therefore, a changeover function is required which inverts the thermo signal when the cooling mode is changed to the heating mode and vice versa.

In order to solve the conventional problems such as a difference between pressures in the duct and a change in pressure in the duct, systems were developed and disclosed in Japanese Utility Model Publication Nos. 48-5294 and 48-29245 and U.S. Pat. No. 3,403,852.

In these conventional air quantity regulating apparatuses, a spring is provided to control the internal resistances corresponding to static pressure components, respectively. The throttle valve is biased by the biasing force of the spring so as to obtain a pressure difference between the upstream portion and the downstream portion of the throttle valve, thereby achieving a constant air quantity function (for supplying the constant air quantity independently of a pressure difference in the duct and a change in pressure in the duct).

However, the conventional air quantity regulating apparatuses must have a large pressure-receiving portion to operate the throttle valve against the biasing force of the spring. Accordingly, the pressure-receiving portion itself forms a hindrance to the air flow. As a result, the minimum operating pressure against the biasing force of the spring is high, and the apparatus as a whole becomes large. A conventional air quantitiy regulating apparatus is also known which uses a bellows diaphragm. However, in an apparatus of this type, the minimum operating pressure cannot be decreased. If the minimum operating pressure is to be decreased, the bellows diaphragm becomes very large. Since these conventional apparatuses do not have a changeover function, the contact point of the room thermostat must be adjusted to the corresponding one to be inside the thermostat or at a position spaced apart therefrom when the cooling mode is changed to the heating mode and vice versa.

A large blower motor and a separate control unit for the changeover function are required, which are both incompatible with the recent trend towards automation and energy conservation.

Apparatuses for changing the air quantity in order to control room temperature have been developed, as disclosed in U.S. Pat. Nos. 3,687,364 and 4,147,298.

These conventional apparatuses have an air quantity detector, so that their minimum operating pressure is lower than that of any other conventional apparatus. In the above apparatuses, air quantitity detection is utilized to determine the closed position of the throttle valve. Such detection is not used to provide the constant air quantitity function. Therefore, the conventional apparatuses cannot compensate for the difference of pressures in the duct and the change in pressure in the duct, thus temporarily resulting in excessive air quantity or lack of air quantity. This indicates that room temperature control cannot be stably performed, and hunting is repeated at predetermined intervals. Also, when an excessive quantity of air is supplied from the supply opening, it may cause considerable noise. In the same manner as in the conventional apparatus having a constant air quantity function, the changeover function is realized only by changing the position of the contact point of the room thermostat. At the same time, the throttle valve must be mechanically stopped so as not to fully close the valve so that the minimum ventilating quantity must be guaranteed. It is also impossible to compensate for the difference of pressures in the duct and the change in pressure in the duct.

In the conventional apparatuses, pneumatic control techniques are more common than any other technique. These pneumatic control techniques are then applied to electric control systems. In pneumatic control, the air quantity is obtained in proportion to a room load. However, when pneumatic control is applied to electric control, the intermediate control position cannot be readily set. Therefore, pneumatic control cannot be satisfactorily utilized for an air quantity regulating apparatus for electric control. Along with the strong demand for energy conservation, it is desired that an air quantity regulating apparatus for the electric control be developed which meets a variety of applications.

SUMMARY OF THE INVENTION

The present invention has been made in consideration of the above problems, and has for its object to provide an air quantity regulating apparatus for electric control, which has constant air quantity, variable air quantity, automatic changeover, and minimum ventilating quantity preset functions, and which has a small minimum operating pressure to realize compactness and a special structure for energy conservation.

BRIEF DESCRIPTION OF THE DRAWINGS

FIG. 7 is a diagram showing the relationship between the air flow speed and the number of revolutions of an impeller;

FIG. 8 is a diagram showing the relationship between the flow rate and the difference in pressure;

FIG. 15A is a timing chart showing the waveform of the output from an operational amplifier 100a;

DETAILED DESCRIPTION OF THE PREFERRED EMBODIMENTS

Now one embodiment of the air quantity regulating apparatus of this invention will be described with reference to the accompanying drawings.

Figure 1:
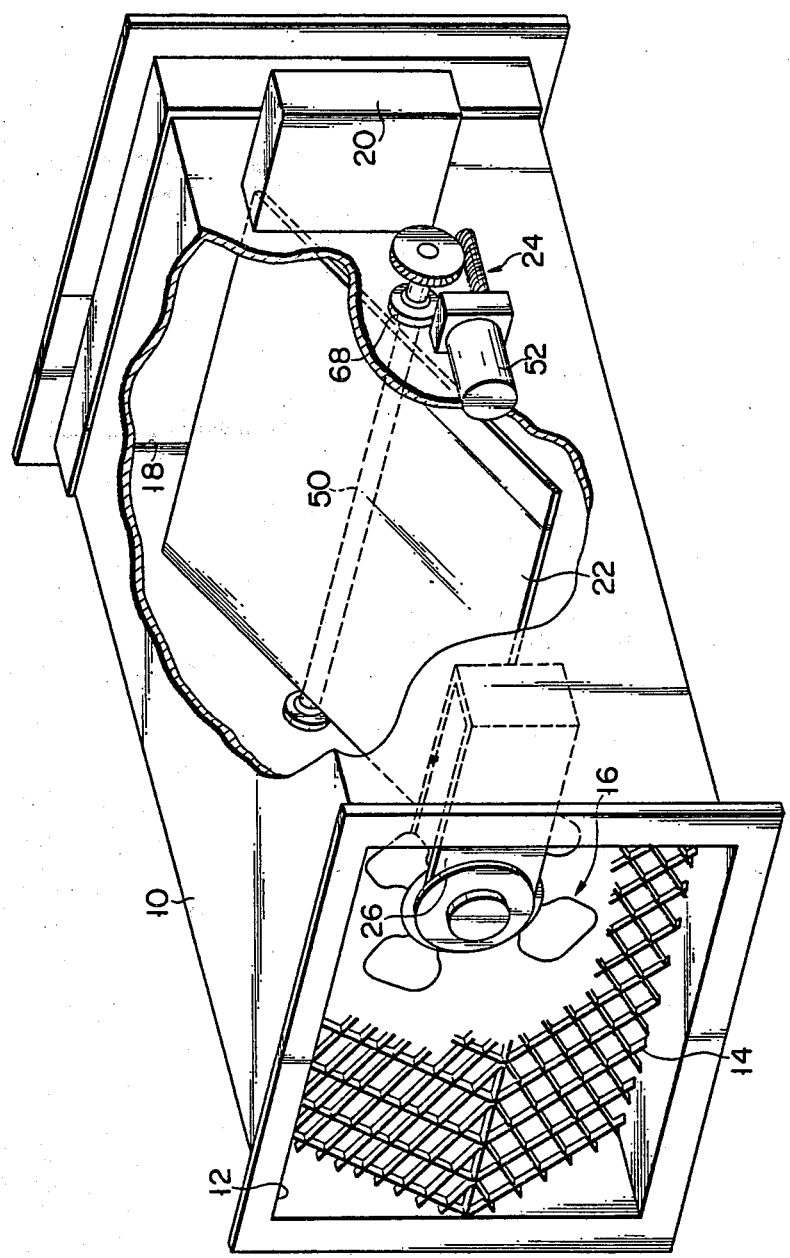
FIG. 1 is a perspective view showing one embodiment of the air quantity regulating apparatus according to the present invention.

Referring now to the drawing of FIG. 1, reference numeral 10 designates a duct member. Each duct member 10 is coupled to the exhaust end of each air duct which diverges from a single blower (not shown). A guard net 14 is attached to one opening or blower-side opening 12 of the duct member 10. The guard net 14 is provided for the purpose of stabilizing the air current and protecting an air quantity detector 16 (mentioned later) against coarse dust and the touch of an operator's hand during installation work. The supply opening 18 of the duct member 10 communicates with a room (not shown). Thus, air at a predetermined temperature from the blower is led into a plurality of rooms to be air-conditioned.

The air quantity detector 16 is disposed near the opening 12 inside the duct member 10. The air quantity detector 16 detects the quantity of air flowing through the duct member 10, and delivers this information to a control mechanism 20 which will be mentioned later. A throttle valve 22 is intended to restrict the flow of air through the duct member 10, and is driven by a driving mechanism 24. The driving mechanism 24 is controlled by the controlled mechanism 20.

Figure 2:
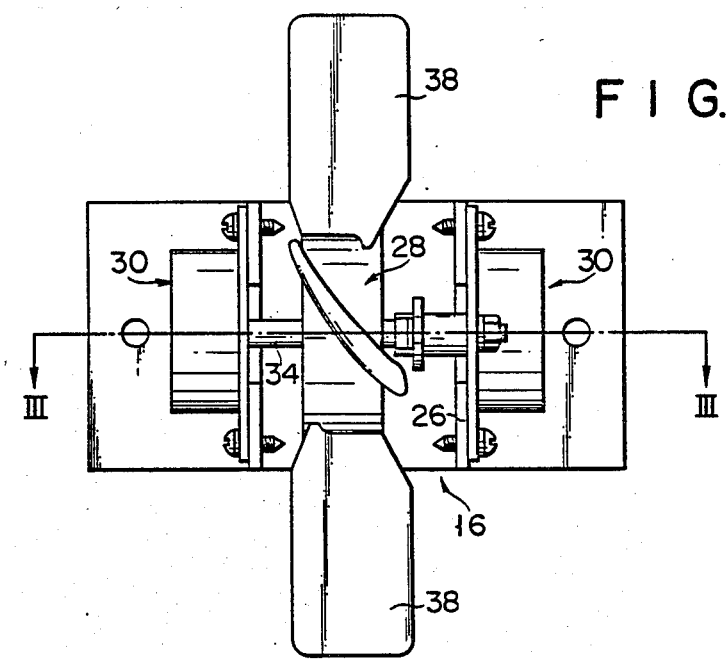
FIG. 2 is an extractive front view of an air quantity detector.
Figure 3:
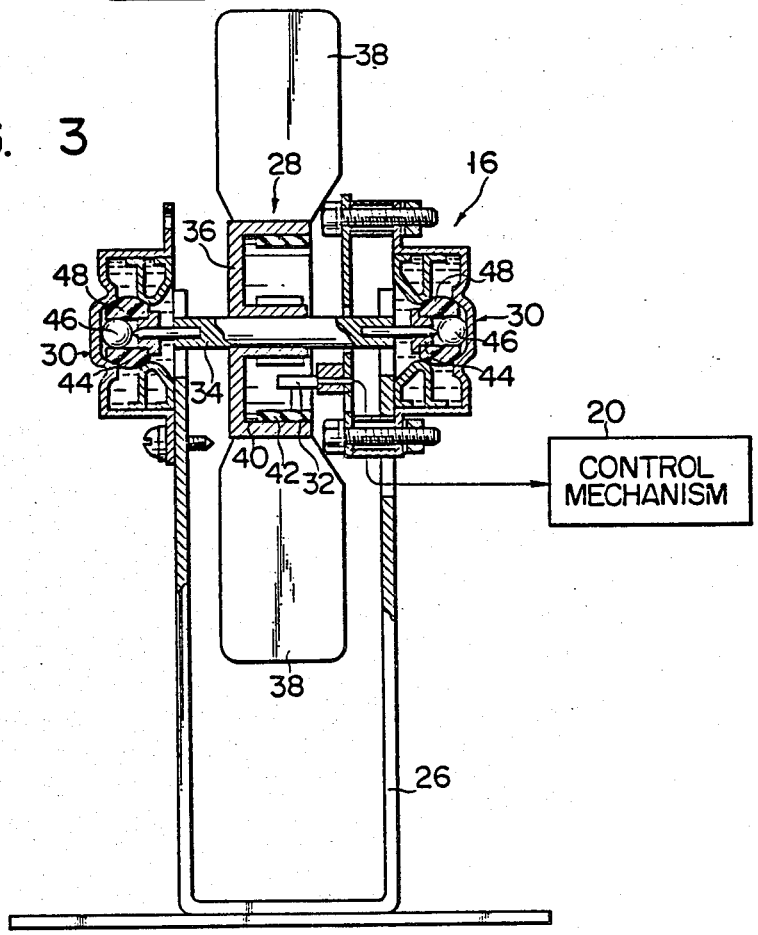
FIG. 3 is a sectional view as taken along line III—III of FIG. 2.

As is extractively shown in FIGS. 2 and 3, the aforesaid air quantity detector 16 includes a pair of support strips 26 fixed on the inner side of the duct member 10, an impeller 28 rotatably disposed between the pair of support strips 26, bearing portions 30 attached to the distal end portions of the support strips 26 and supporting the impeller 28 so that the impeller 28 may rotate in a substantially no-load state, and a revolution sensor 32 for detecting the number of revolutions of the impeller 28. The pair of support strips 26 are arranged in parallel with each other at a predetermined space, having their distal ends extended to the central portion of the duct member 10. The impeller 28 includes a shaft portion 34 extending along one direction of the duct member 10 in which air flows, a cylindrical main body 36 coaxially fixed on the shaft portion 34, and four blade portions 38 arranged at regular intervals around the main body 36. An annular groove portion 40 is formed in one side face of the main body 36. The center of the groove portion 40 is coincident with the axis of rotation. A four-poles rubber magnet 42 is attached to the outer circumferential wall of the groove portion 40, with four poles arranged at regular intervals.

Each bearing portion 30 includes an oilless bearing 44 rotatably holding the outer circumferential surface of each end portion of the shaft portion 34, and a steel ball 46 pivotally sustaining each end of the shaft portion 34. The steel ball 46 is disposed in a self-aligning mechanism 48 of the bearing portion 30. Supported by the bearing portions 30 of such construction, the impeller 28 is ready to rotate with hardly any load. In other words, even a slight air flow causes the rotation to start. As shown in FIG. 7, moreover, the impeller 28 is so designed as to rotate in substantially direct proportion to the air speed even in a relatively low-speed range.

In this embodiment, the revolution sensor 32 is formed of a magnetic resistance element, which can detect a change in the magnetic field caused by the rotation of the rubber magnet 42 in accordance with the rotation of the impeller 28 and extract a signal according to the detection. The tip end of the revolution sensor 32 extends into the circumferential groove portion 40 and is located in the vicinity of the rubber magnet 42. The output end of the revolution sensor 32 is connected to the control mechanism 20.

Turning now to FIG. 1, the throttle valve 22 is in the form of a plate which is provided at the center with a driven shaft 50 extending horizontally and at right angles to the aforesaid direction of the duct member 10. The throttle valve 22 is rotatably mounted on the driven shaft 50 so that it may completely prevent the passage of air when located at an angle of approximately 45° to the horizontal direction, and that it may allow 100% passage of air when located in a substantially horizontal position.

Figure 5:
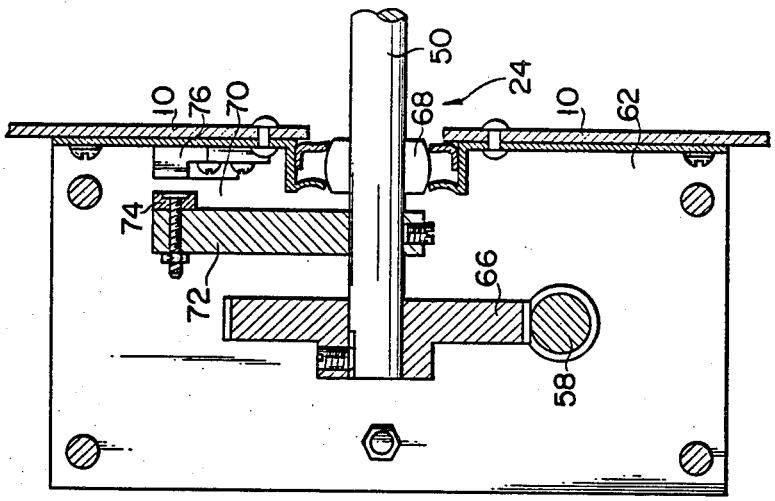
FIG. 5 is a sectional view taken along line V—V of FIG. 4.
Figure 4:
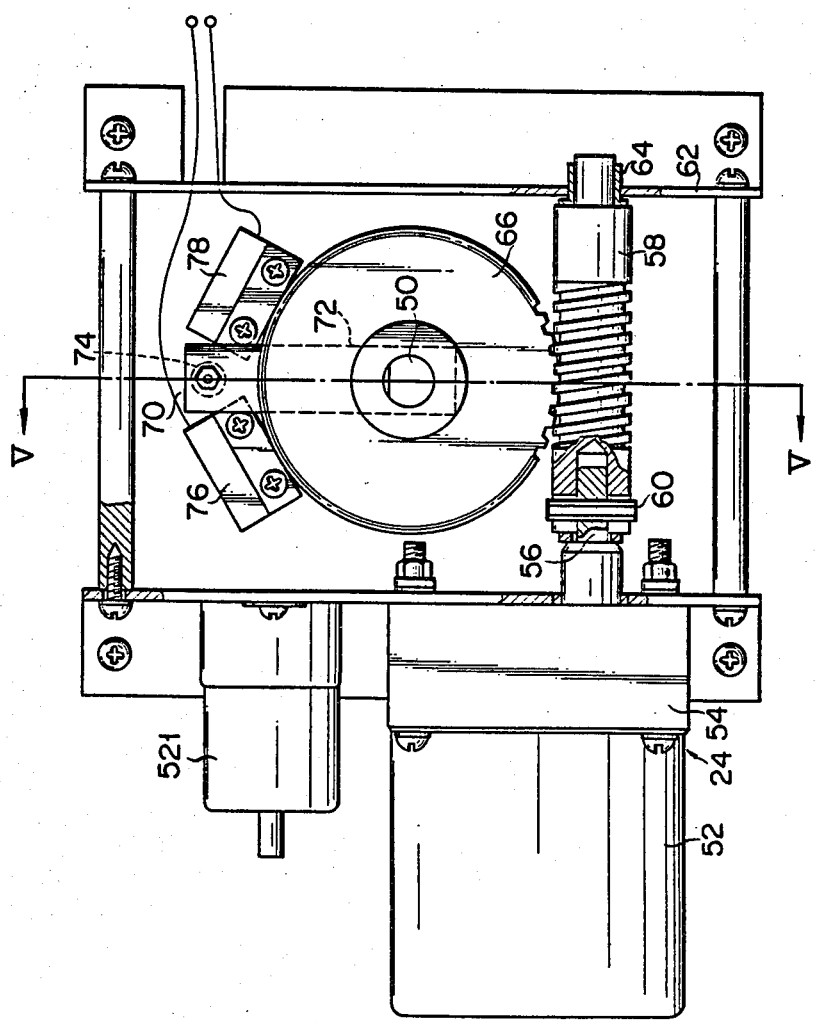
FIG. 4 is an extractive front view of a driving mechanism.

As is extractively shown in FIGS. 4 and 5, the driving mechanism 24 for driving the throttle valve 22 is provided with a reversible driving motor 52 and a capacitor 521. The driving motor 52 is provided with a gear head 54 having a function of speed reduction. A driving shaft 56 which is rotated by the driving force of the driving motor 52 protrudes from the gear head 54. The rotating axis of the driving shaft 56 extends along the aforesaid direction of the duct member 10. A worm gear 58 is coaxially mounted on the distal end of the driving shaft 56 by means of a coupling device 60. The coupling device 60 is so designed as to transmit the rotation of the driving shaft 56 to the worm gear 58, but not directly to transmit the axial movement of the worm gear 58 to the driving shaft 56. The distal end of the worm gear 58 is rotatably supported by means of a bearing 64 on a support plate 62 which is fixed to the outer wall of the duct member 10. The worm gear 58 is in mesh with a worm wheel 66. The rotating axis of the worm wheel 66 is at a right angle to that of the worm gear 58, and is aligned with the driven shaft 50. The driven shaft 50 and the worm wheel 66 are fixed to each other. Each end of the driven shaft 50 is rockably sustained by means of a bearing 68 which is fixed on the outer side of the duct member 10. The bearing 68 has a self-aligning function to automatically correct the inclination of the supported driven shaft 50.

The driven shaft 50 is fixedly fitted with a support arm 72 extending at right angles thereto. A magnet 74 is attached to the distal end of the support arm 72. Further, two reed switches 76 and 78 on-off controlled by the magnet 74 are set in predetermined positions on the duct member 10. The support arm 72, the magnet 74, and the two reed switches 76 and 78 constitute a detector 70 for detecting the rocking position of the throttle valve 22. One reed switch 76 is located so that it may detect when the worm wheel 66 has rocked in the counterclockwise direction (as in FIG. 4) to rock the throttle valve 22 to a position where a passage defined by the inner periphery of the duct member 10 is completely blocked. The other need switch 78 is located so that it may detect when the worm wheel 66 has rocked in the clockwise direction (FIG. 4) to rock the throttle valve 22 to a position where the passage of the duct member 10 is opened to its full width. Namely, the movable range of the throttle valve 22 can be detected by means of the detector 70. The output end of the detector 70 or the output ends of the reed switches 76 and 78 are connected to the control mechanism 20.

Figure 6:
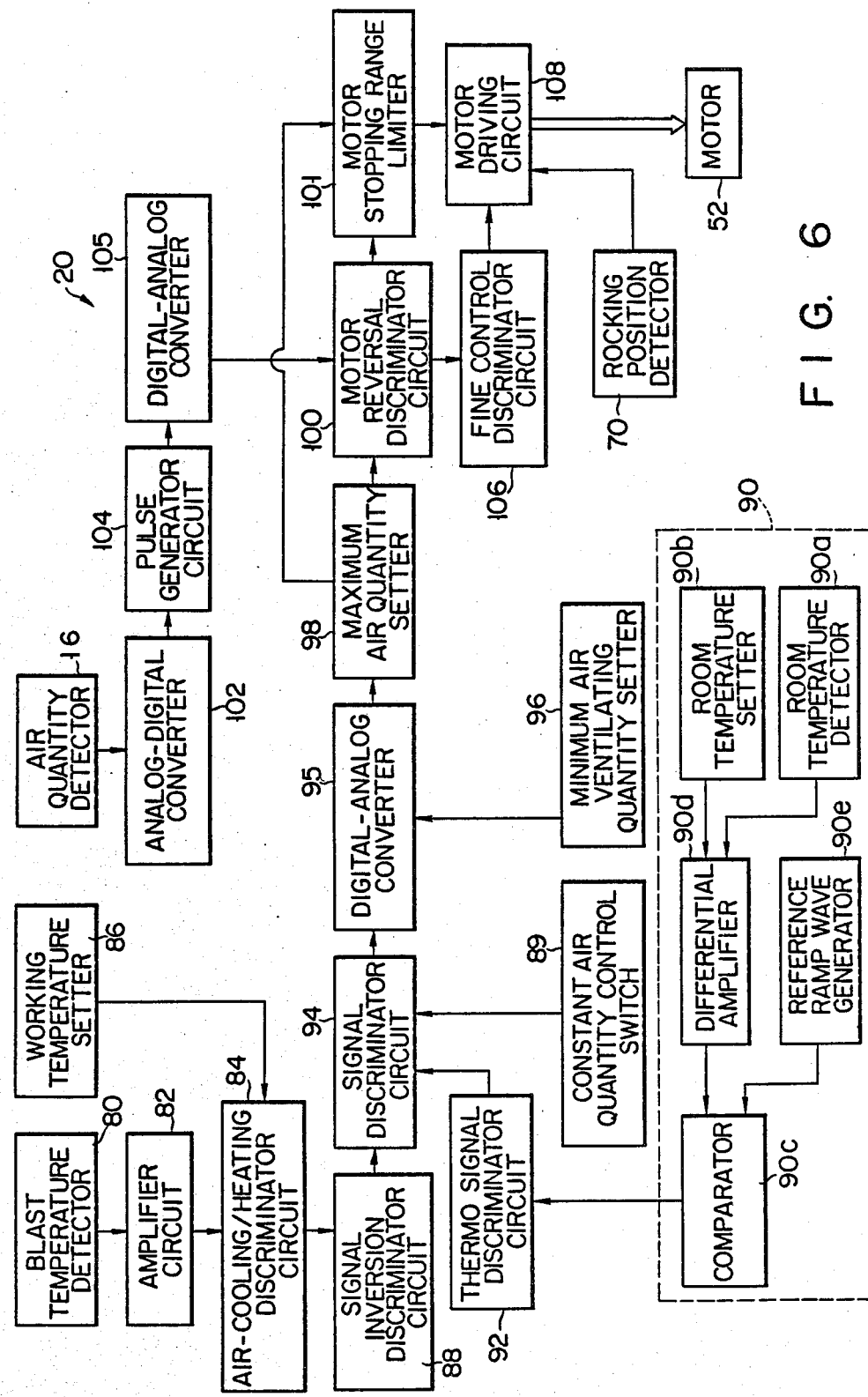
FIG. 6 is a block diagram of a control mechanism.

The control mechanism 20 for controlling the drive of the driving motor 52 is constructed as shown in FIG. 6.

The control mechanism 20 has constant air quantity function and variable air quantity function in accordance with a signal from a room thermostat 90 to be described later. The schematic arrangement of the control mechanism 20 will be described with reference to the block diagram in FIG. 6.

The control mechanism 20 includes a blast temperature detector 80 for detecting the air temperature, arranged in the duct member 10. A detection signal from the blast temperature detector 80 is amplified by an amplifier circuit 82 to which the blast temperature detector 80 is connected. The amplifier circuit 82 is connected to an air-cooling/heating discriminator circuit 84. On the other hand, to the air-cooling/heating discriminator circuit 84 is connected a working temperature setter 86. The working temperature setter 86 serves to set a changeover temperature in the air quantity regulating apparatus when the heating mode is changed to the cooling mode and vice versa.

The air-cooling/heating discriminator circuit 84 compares the air temperature detected by the blast temperature detector 80 and the changeover temperature set by the working temperature setter 86. The air-cooling/heating discriminator circuit 84 then determines whether the operating mode is the cooling or heating mode. The air-cooling/heating discriminator circuit 84 stores data of the first changeover temperature at which the heating mode is changed to the cooling mode and data of the second changeover temperature at which the cooling mode is changed to the heating mode. The first and second changeover temperatures are automatically determined when the changeover temperature is set in the working temperature setter 86. The first and second changover temperature are determined lower and higher than the set changeover temperature by a predetermined value. Thus, the air-cooling/heating discriminator circuit 84 has hysteresis characteristics with respect to temperature.

Sometimes the air conditioner has an air quantity regulating apparatus and a separate room thermostat for producing a signal to turn on/off a cooling/heating source of the air conditioner. In this case, for example during the cooling mode, when a refrigerator of the air conditioner is stopped, the air temperature is temporarily increased and may often reach a temperature range in the heating mode. When this occurs, the air conditioner is driven in the cooling mode, on the other hand the air quantity regulating apparatus is driven in the heating mode so that room temperature control is indefinite. For this reason, the predetermined hysteresis is given to the air-cooling/heating discriminator circuit 84, and the heating mode is not initiated unless the air temperature is considerably increased. On the other hand, in the heating mode, the cooling mode is not initiated unless the air temperature is considerably decreased. Therefore, as mentioned above the first changeover temperature is lower than the second changeover temperature. The air-cooling/heating discriminator circuit 84 is connected to a signal inversion discriminator circuit 88.

The signal inversion discriminator circuit 88 determines whether or not the signal from the air-cooling/heating discriminator circuit 84 is inverted in accordance with the mode of operation which is determined by the circuit 84 with relation to the room thermostat 90 described later. Now assume that the room thermostat 90 detects a room temperature higher than the preset temperature both in the cooling and heating modes. In this case, even under the same operating conditions, the air quantity must be increased in the cooling mode, however, the air quantity must be decreased in the heating mode. The signal inversion discriminator circuit 88 allows the signal from the circuit 84 to pass in the prescribed form in the cooling mode and inverts the signal therefrom in the heating mode. The signal inversion discriminator circuit 88 is connected to a signal discriminator circuit 94.

To the signal discriminator circuit 94 is then connected a constant air quantity control switch 89. When the constant air quantity control switch 89 is turned on, the control mechanism 20 is operated in the constant air quantity function. However, when the switch 89 is turned off, the control mechanism 20 is operated in the variable air quantity function in cooperation with the room thermostat 90. The signal discriminator circuit 94 thus determines the ON/OFF state of the switch 89. In other words, the signal discriminator circuit 94 determines if the signal from the signal inversion discriminator circuit 88 indicates the constant air quantity function or the variable air quantity function. To the signal discriminator circuit 94 is connected the room thermostat 90 through a thermo signal discriminator circuit 92.

The room thermostat 90 compares the preset temperature of the zone to be air-conditioned and the actual room temperature (detected temperature), and generates a thermo signal to represent a temperature different between the preset temperature and the detected temperature. The termo signal is then properly converted by the thermo signal discriminator 92 so as to be supplied to the signal discriminator circuit 94. The room thermostat 90 has a room temperature detector 90a for detecting room temperature and a room temperature setter 90b for setting room temperature. The room temperature detector 90a and the room temperature setter 90b are connected to a common differential amplifier 90d in which a difference between the preset temperature and the actual room temperature is amplified. The differential amplifier 90d is connected to a comparator 90c to which is connected a reference ramp wave generator 90e. The reference ramp wave generator 90e generates a reference value to be compared with the difference between the preset value and the actual room temperature. The output signal from the comparator 90c is defined as the thermo signal. The comparator 90c is also connected to the thermo signal discriminator circuit 92.

The signal discriminator circuit 94 is connected to a D/A converter 95. The signals described so far are all digital signals. The digital signal is converted to an analog signal by the D/A converter 95. To the D/A converter 95 is connected a minimum air ventilating quantity setter 96. A system adopting the air quantity regulating apparatus of the type described above is called an "all air" system in which heating and cooling are performed only by supplied air. In order to maintain a proper room atmosphere, external air must be constantly supplied in a proper amount and the concentrations of gases such as $CO_2$ and CO must be kept below specific limits. Therefore, even if the room temperature reaches a preset value, a proper amount of air must be constantly supplied. The proper amount of air is called the minimum ventilating air quantity, which is determined by the number of people who will normally be using the room which is to be air conditioned. The minimum air ventilating quantity setter 96 is arranged to guarantee the minimum air ventilating quantity. Data of the minimum air ventilating quantity has priority over the thermo signal.

The D/A converter 95 is connected to a maximum air quantity setter 98. The setter 98 serves as a constant air quantity setter in the constant air quantity mode and as a maximum air quantity setter in the variable air quantity mode.

The maximum air quantity setter 98 is connected to a motor reversal discriminator circuit 100 and a motor stopping range limiter 101. The motor reversal discriminator circuit 100 determines if the motor 52 is to be driven in the forward or reverse direction. In other words, the motor reversal discriminator circuit 100 determines whether the throttle valve 22 is opened or closed. This discrimination is performed in accordance with the signal from the maximum air quantity setter 98 and the signal from the air quantity detector 16. The air quantity detector 16 detects the air quantity in an analog form. This analog signal is detected in practice such that a DC voltage including a ripple component. Therefore, after the analog signal is converted to a digital signal, it must be converted again to an analog signal which is then supplied to the motor reversal discriminator circuit 100. For this purpose, the air quantity detector 16 is connected to an A/D converter 102 where the air quantity signal is converted to a digital signal. The A/D converter 102 is connected to a pulse generator circuit 104. The pulse generator circuit 104 generates a number of pulses in accordance with the level of digital signal. The pulse generator circuit 104 is connected to a D/A converter 105. An analog signal is produced from the D/A converter 105 in accordance with the number of pulses generated by the pulse generator circuit 104. The D/A converter 105 is connected to the motor reversal discriminator circuit 100.

The motor stopping range limiter 101 defines the motor stopping range and the motor start range in accordance with the signals from the maximum air quantity setter 98 and the motor reversal discriminator circuit 100. The motor stopping range limiter 101 determines that the preset value is equal to the actual air quantity even if they differ slightly from each other. In other words, the limiter 101 defines a non-controllable range between the motor stopping range and the motor start range. Unless a quantity which exceeds the non-controllable range occurs, the motor is not immediately stopped or started. Therefore, even if a change in air quantity of the branched air flows is detected, the motor control is not performed in response to such a change, thus decreasing the number of pivotal movements of the throttle valve and contributing to a longer service life. Furthermore, the non-control range can also be varied in accordance with air speeds. The absolute value of the non-controllable range at a high air speed is great, whereas the ratio of the air quantity at a high air speed to the preset air quantity is small. The absolute value of the non-controllable range at a low speed is small, whereas the ratio of the air quantity at a low speed to the preset air quantity is great. When the air speed is increased, the branched air flows are generally increased. The ripple component of the air flows are neglected to achieve stable control.

The motor reversal discriminator circuit 100 is connected to a fine control discriminator circuit 106. The circuit 106 determines if the motor 52 is to be continuously driven or driven by inching. The fine control discriminator circuit 106 causes the motor 52 to continuously rotate when a difference between the detected air quantity and the preset air quantity is greater than a predetermined value. However, when the difference is smaller than the predetermined value, the motor 52 is driven by inching. Thus, the detected air quantity properly corresponds to the preset air quantity. In this manner, when the difference between the preset air quantity and the detected air quantity reaches the predetermined value, the throttle valve 22 is temporarily stopped and the actual air quantity is detected. Thus, the actual air quantity is accurately measured. After detection sampling is performed, overshooting does not occur since the motor is gradually rotated, and the detected air quantity will accurately coincide with the preset air quantity.

The fine control discriminator circuit 106 is connected to a motor driving circuit 108. To the motor driving circuit 108 are connected the motor stopping range limiter 101 and the rocking position detector 70. The motor driving circuit 108 is connected to the motor 52 and drives it in response to various signals.

Figure 12:
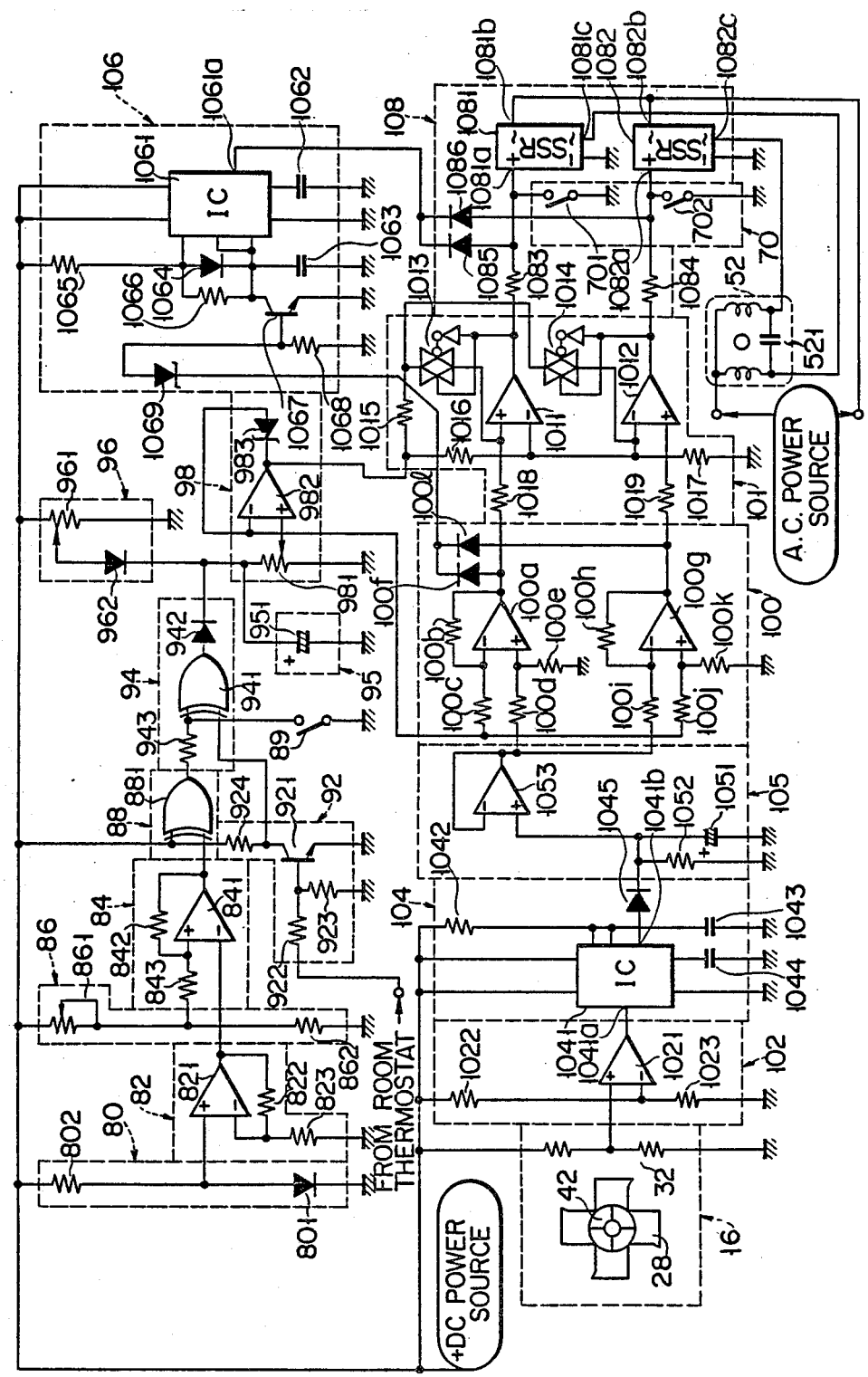
FIG. 12 is a working circuit diagram of the block diagram shown in FIG. 6.

With reference to FIG. 12, the working circuit diagram of the block diagram of FIG. 6 will be described. Along with it, the mode of operation of the control mechanism 20 will also be described with reference to FIGS. 13 to 17.

As described above, the control mechanism 20 has the constant air quantity function, and the variable air quantity function in conjunction with the room thermostat 90. In order to help understand the mode of operation, a structure will first be described in which the constant air quantity function is obtained. Thereafter, a structure will be described in which the variable air quantity function is obtained in combination with the room thermostat 90.

The constant air quantity control switch 89 comprises an ON-OFF switch. The signal discriminator circuit 94 includes an exclusive OR gate 941, a diode 942 and a resistor 943. The switch 89 is connected to one input terminal of the exclusive OR gate 941. When the switch 89 is turned on, a signal of low level is supplied to the one input terminal of the exclusive OR gate 941. The signal inversion discriminator circuit 88 has an exclusive OR gate 881. The output terminal of the exclusive OR gate 881 is connected to the one input terminal of the exclusive OR gate 941 through the resistor 943. Therefore, when the switch 89 is turned on, the one terminal thereof is grounded. Even if the output of the exclusive OR gate 881 is set at a high or low level, the output signal therefrom can be cancelled.

Since the air quantity regulating apparatus serves as the constant air quantity apparatus, the room thermostat 90 is disconnected. No signal is supplied to the input terminal of the thermo signal discriminator circuit 92 which comprises a transistor (to be referred to as a Tr. hereinafter) 921 and resistors 922, 923 and 924. In other words, the base of the Tr. 921 is grounded through the resistor 923, so that the Tr. 921 is not biased. The Tr. 921 then acts as a high impedance, and a signal of high level is supplied to the other input terminal of the exclusive OR gate 941 through the resistor 924. As a result, the signals of low and high levels are respectively supplied to the one and the other input terminals of the exclusive OR gate 941, thereby producing a high level output.

The output terminal of the exclusive OR gate 941 which produces a high level signal is connected, through the diode 942, to the D/A converter 95 which has a capacitor 951. The diode 942 disables the reverse flow of charge from the capacitor 951 therethrough. Therefore, the exclusive OR gate 941 causes the capacitor 951 to charge fully through the diode 942.

The capacitor 951 is connected to a variable resistor 981 of the maximum air quantity setter 98 which further includes an operational amplifier (to be referred to as an op amp hereinafter) 982 and a Zener diode 983. The variable resistor 981 is arranged to divide the voltage corresponding to the full charge of the capacitor 951 and is able to set a maximum air quantity value. In other words, if a voltage across the variable resistor 981 is predetermined to correspond to the maximum air quantity value, the air quantity can be preset by the variable resistor 981. This is related to VAV control (variable air volume control), that is, the control operation by the room thermostat 90. The voltage across the variable resistor 981 can be changed by the charging level of the capacitor 951.

The minimum air ventilating quantity setter 96 which has a variable resistor 961 and a diode 962 is connected to the capacitor 951. However, by utilizing the constant air quantity function, the variable resistor 961 is grounded, and a signal is not supplied to the capacitor 951 through the diode 962. The motor reversal discriminator circuit 100 includes op amps 100a and 100g, diodes 100f and 100l, and resistors 100b, 100c, 100d, 100e, 100h, 100i, 100j and 100k. The variable resistor 981 of the maximum air quantity setter 98 is connected to the non-inverting input terminal on an op amp 982 which functions as a voltage follower. By this function of the op amp 982, the signal from the variable resistor 981 is supplied to the inverting input terminal of the op amp 100a through the resistor 100c of the motor reversal discriminator circuit 100. On the other hand, the signal from the variable resistor 981 is voltage-divided by the resistors 100j and 100k and is supplied to the non-inverting input terminal of the op amp 100g through the resistor 100j. In other words, the op amps 100a and 100g function as differential amplifiers.

The air quantity detector 16 includes a rubber magnet 42 (a sintered magnet can be used in place of the rubber magnet 42) and a revolution sensor 32 for detecting rotation of the rubber magnet 42. Since the impeller 28 is rotated at a speed in proportion to the air speed, the rubber magnet 42 is also rotated in proportion to the air speed. The revolution sensor 32 has a magnetic-resistance element. The magnetic-resistance element has characteristics in which its resistance is changed upon excitation of the rubber magnet 42. Therefore, the magnetic-resistance element picks up the signal corresponding to the rotational frequency of the rubber magnet 42 mounted in the impeller 28. When data of a sectional area through which the air flows is prestored before the signal is picked up by the magnetic-resistance element, the rubber magnet 42 and the revolution sensor 32 function as the air quantity detector.

Figure 13A:
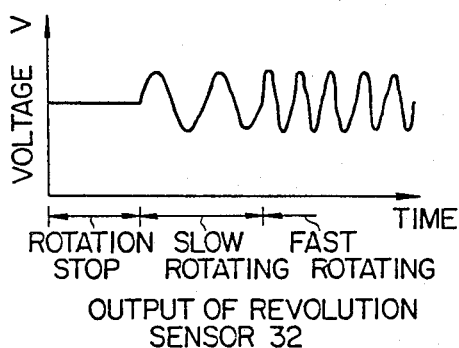
FIG. 13A is a timing chart showing the waveform of the output from a revolution sensor.
Figure 13B:
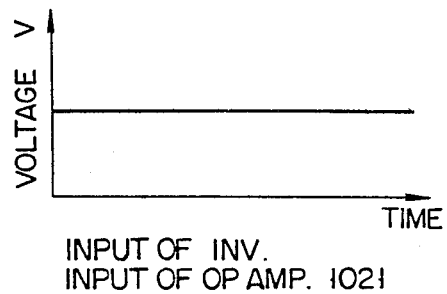
FIG. 13B is a timing chart showing the waveform of the input to an inverting input terminal of an operational amplifier 1021.
Figure 13C:
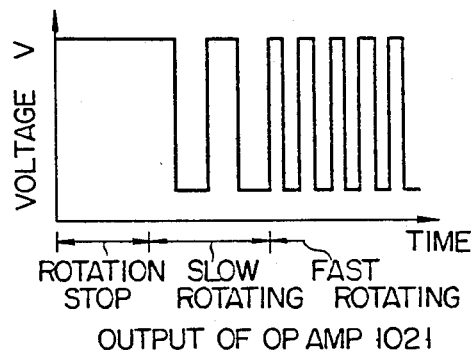
FIG. 13C is a timing chart showing the waveform of the output from the operational amplifier 1021.

The revolution sensor 32 of the air quantity detector 16 detects a DC voltage which includes a ripple component, as shown in FIG. 13A. The DC voltage is applied to the non-inverting input terminal on an op amp 1021 (as a comparator) of the D/A converter 102 which comprises the op amp 1021 and resistors 1022 and 1023. A voltage which is voltage-divided by the resistors 1022 and 1023 and corresponds to a median point of the ripple component detected by the air quantity detector 16 is supplied to the inverting input terminal of the op amp 1021, as shown in FIG. 13B. As a result, the signal is converted to a digital signal by the op amp 1021, as shown in FIG. 13C.

Figure 14A:
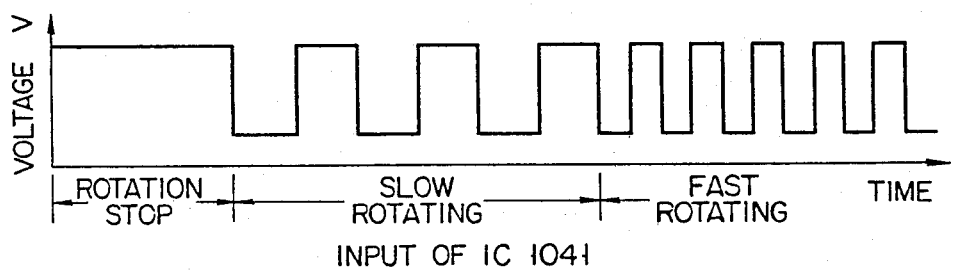
FIG. 14A is a timing chart showing the waveform of the input to an IC 1041.
Figure 14B:
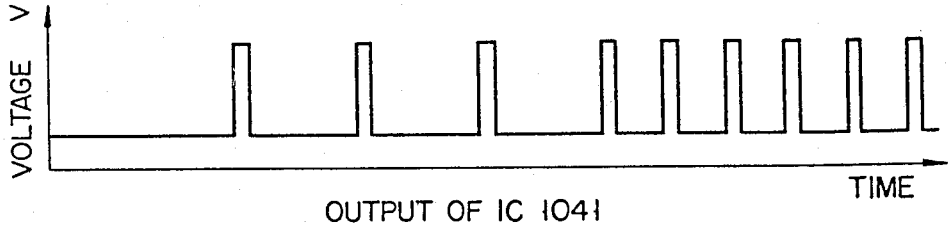
FIG. 14B is a timing chart showing the waveform of the output from the IC 1041.

The output terminal of the op amp 1021 is connected to an input terminal 1041a of an IC 1041 of the pulse generator circuit 104 which comprises the IC 1041 called as a function block, a resistor 1042, capacitors 1043 and 1044, and a diode 1045. The IC 1041 serves as a monostable multi-vibrator and is triggered when the signal becomes low which is supplied to the input terminal 1041a. The IC 1041 generates an output signal of high level from an output terminal 1041b thereof. The pulse width of this output signal is defined by the resistor 1042 and the capacitor 1043. The capacitor 1044 is arranged to guarantee the stable operation of the IC 1041. FIGS. 14A and 14B respectively show the input signal to the input terminal 1041a and the output signal from the output terminal 1041b of the IC 1041. As may be apparent from FIGS. 14A and 14B, the IC 1041 is a negative edge triggered monostable multivibrator, where the negative edge trigger indicates that an output is produced when an input pulse becomes low.

The circuit described above is so arranged for the following reason. As long as the impeller 28 rotates, the number of high level outputs from the op amp 1021 increases, but the energy of these high level outputs is constant. In other words, when the impeller 28 rotates at a low speed, the pulse width is widened. However, when the impeller 28 rotates at a high speed, the pulse width is narrowed. In this manner, the energy per unit time cannot be changed in accordance with the rotational frequency. In order to obtain energy in proportion to a given rotational frequency, a number of pulses, each having a given pulse width, must be obtained in proportion to the given rotational frequency. This is achieved according to the circuit arrangement described above.

The output terminal 1041b of the IC 1041 is connected to a capacitor 1051 of the D/A converter 105 through the diode 1045. The D/A converter 105 comprises the capacitor 1051 and a resistor 1052 and an op amp 1053. The diode 1045 disables the reverse flow of charge from the capacitor 1051 when the output terminal 1041b of the IC 1041 becomes low. The capacitor 1051 serves to convert the digital signals to analog signals in proportion to their number. The resistor 1052 is arranged to improve response time so as to properly discharge the capacitor 1051 which is then able to receive updated information. The op amp 1053 serves as a voltage follower and supplies a charge of the capacitor 1051 to the motor reversal discriminator circuit 100 without modifying its energy level.

It is understood from the aforesaid description that the motor reversal discriminator circuit 100 receives both the preset air quantity signal and the detected air quantity signal.

The inverting input terminal of the op amp 982 is connected to the inverting input terminal of the op amp 100a through the resistor 100c. On the other hand, the inverting input terminal of the op amp 982 is voltage-divided by the resistors 100j and 100k and is also connected to the non-inverting input terminal of the op amp 100g through the resistor 100j. The output terminal of the op amp 1053 is connected to the inverting input terminal of the op amp 100g through the resistor 100i. On the other hand, the output terminal of the op amp 1053 is voltage-divided by the resistors 100d and 100e and is also connected to the non-inverting input terminal of the op amp 100a through the resistor 100d.

Figure 15A:
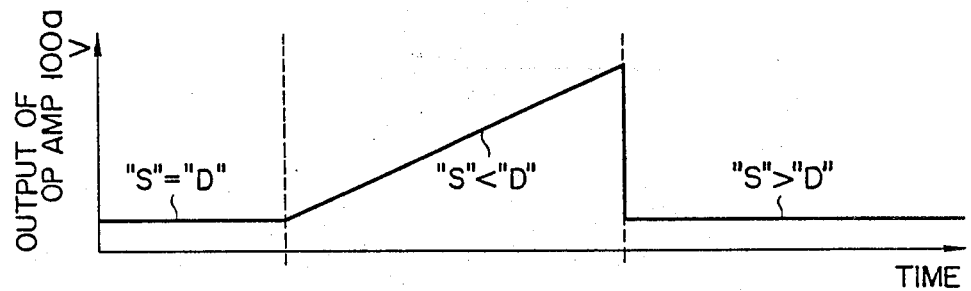
Figure 15B:
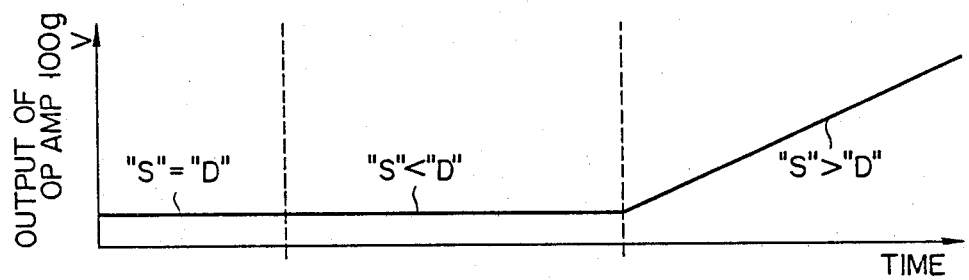
FIG. 15B is a timing chart showing the waveform of the output from an operational amplifier 100g.
Figure 17:
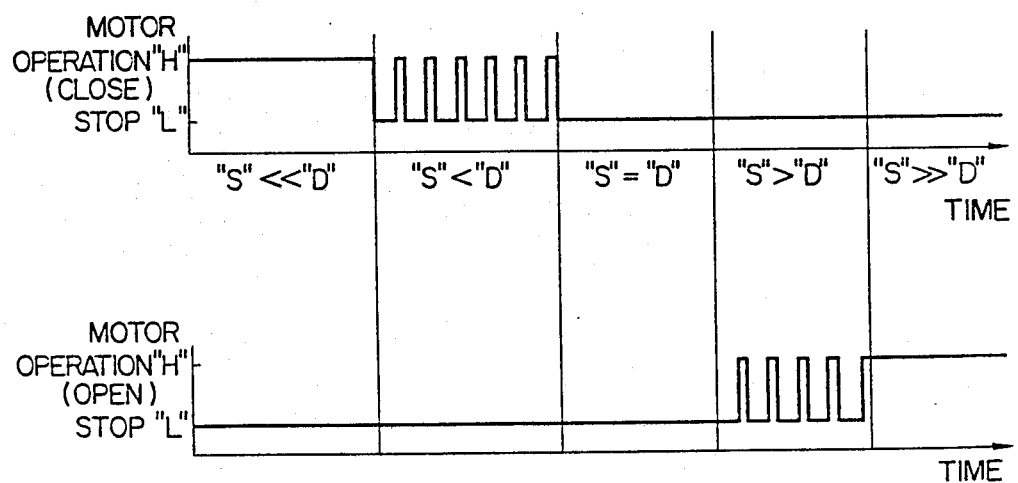
FIG. 17 ia a timing chart showing "close" and "open" operations of the motor.

Since the op amps 100a and 100g function as differential amplifiers, they respectively produce signals each corresponding to a difference between the preset air quantity ("S") and the detected air quantity ("D"). Specifically, when the preset air quantity ("S") is equal to the detected air quantity ("D"), the op amps 100a and 100g do not perform amplification, as shown in FIGS. 15A and 15B, respectively. Accordingly, the motor 52 remains stopped. When the preset air quantity ("S") is smaller than the detected air quantity ("D"), the op amp 100a amplifies a difference and produces a differential signal, as shown in FIG. 15A. In this case, however, the op amp 100g does not perform amplification and is kept low, as shown in FIG. 15B. It is understood that the op amp 100a causes the motor to operate so as to close the throttle valve. When the preset air quantity ("S") is greater than the detected air quantity ("D"), the op amp 100a does not perform amplification and is kept low, as shown in FIG. 15A. However, the op amp 100g amplifies a difference and produces a differential output, as shown in FIG. 15B, thereby causing the motor to operate so as to open the throttle valve 22.

The output terminal of the op amp 100a is connected to the fine control discriminator circuit 106 through the diode 100f and to the motor stopping range limiter 101 through a resistor 1018. The output terminal of the op amp 100g is connected to the fine control discriminator circuit 106 through the diode 100l and to the motor stopping range limiter 101 through a resistor 1019. The diodes 100f and 100l are arranged so as not to mix the signals from the op amps 100a and 100g.

The motor stopping range limiter 101 will be described in detail. The limiter 101 includes op amps 1011 and 1012, bilateral switches 1013 and 1014, and resistors 1015, 1016, 1017, 1018 and 1019. In practice, the speed of air flowing in the air conditioning system is not constant, and the air generally includes a ripple component to some extent. The ripple component generally increases in porportion to the air speed. The motor stopping range limiter 101 serves to widen the motor stop or non-controllable range in which the motor is not operated for the ripple component. Thus, the control precision of the air quantity is improved by the motor stopping range limiter 101. The non-controllable range is widened so as not to respond to the ripple (variation) component of the air quantity unless some problem occurs.

The mode of operation of the motor stopping range limiter 101 will now be described. A signal obtained by adding a Zener voltage of the Zener Diode 983 to the signal set by the maximum air quantity setter 98 is voltage-divided by the resistors 1016 and 1017 and is then supplied to the inverting input terminals of the op amps 1011 and 1012. This indicates that the signal supplied to the inverting input terminals of the op amps 1011 and 1012 changes when the signal from the maximum air quantity setter changes. Specifically, when the signal from the maximum air quantity setter 98 has a large magnitude, the motor stopping range is widened, but when the signal from the maximum air quantity setter 98 has a small magnitude, the motor stopping range is narrowed.

Now assume that the level of the signal from the maximum air quantity setter 98 is constant since the constant air quantity mode is considered. Also assume that the motor 52 is stopped. A signal of low level is supplied from the op amp 100a to the non-inverting input terminal of the op amp 1011. In this case, if the preset air quantity is smaller than the detected air quantity, the output level of the op amp 100a is increased. When the output signal level of the op amp 100a becomes higher than the input signal level at the inverting input terminal of the op amp 1011, the op amp 1011 functions as the comparator and generates a signal of high level. Once the op amp 1011 generates a high level signal, it serves as a comparator with hysteresis in accordance with a combination to be described later. By this hysteresis, the op amp 1011 produces a low level signal at a point lower than the signal when the op amp 1011 produces a high level signal.

The signal of high level from the op amp 1011 causes the bilateral switch 1013 to act as a low impedance. A voltage at the cathode of the Zener diode 983 is supplied to the non-inverting input terminal of the op amp 1011 through the resistor 1015. Therefore, the signal at the non-inverting input terminal of the op amp 1011 becomes high. When the output level of the op amp 100a becomes lower than the level at which the op amp 1011 generates the high level signal, the op amp 1011 produces a low level signal. The bilateral switch 1013 then becomes a high impedance, and then the op amp 1011 restores the initial function as the comparator. In the arrangement described above, the detected air quantity is controlled to come closer to the preset air quantity so as to alleviate the drawbacks caused by a wide non-controllable range once the op amp 1011 produces a high level signal.

The op amp 1012 performs the same operation as the op amp 1011, and a detailed description thereof will be omitted.

As described above, when the op amp 1011 produces the high level signal, the motor 52 performs "close" operation to close the throttle valve 22. However, when the op amp 1012 produces the high level signal, the motor 52 performs the "open" operation in which the throttle valve 22 is opened upon rotation of the motor 52. The output terminals of the op amps 1011 and 1012 are connected to the motor driving circuit 108.

The fine control discriminator circuit 106 comprises an IC 1061 which is call a function block (a stable multivibrator), capacitors 1062 and 1063, a diode 1064, resistors 1065, 1066 and 1068, a Tr. 1067 and a Zener diode 1069. When the detected air quantity is greater or smaller than the preset air quantity such that their difference exceeds a predetermined range, the fine control discriminator circuit 106 causes the motor 52 to perform continuous "close" or "open" operations. However, when the difference falls within the predetermined range, the fine control discriminator circuit 106 causes the motor 52 to perform fine "close" or "open" operations by inching.

The fine control discriminator circuit 106 will be described in detail. Since the operation of the circuit 106 in the "close" operation mode is similar to that in the "open" operation mode, the description to follow will consider mainly the "close" operation.

Figure 16A:
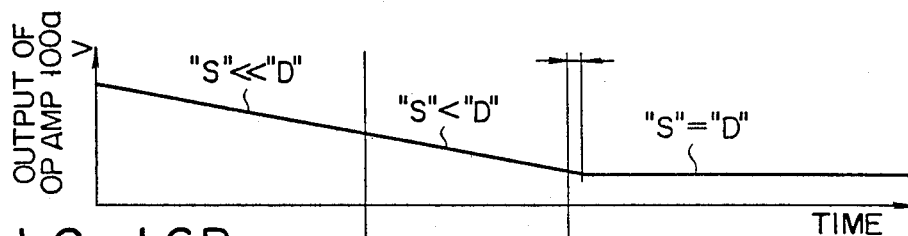
FIGS. 16A to 16C are timing charts showing the waveforms of the outputs from operational amplifiers 100a and 1011 and an IC 1061.
Figure 16B:
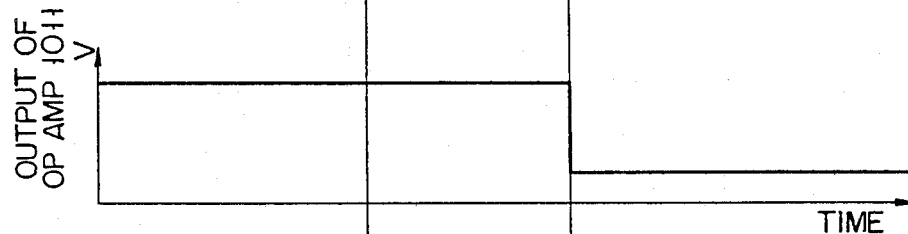
Figure 16C:
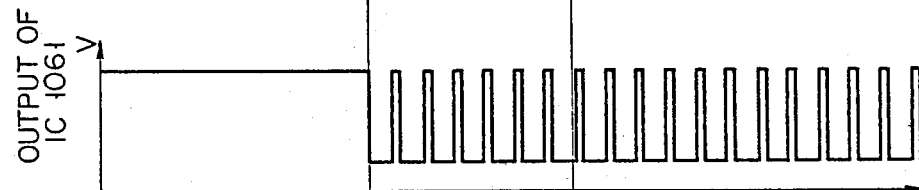
Figure 16D:
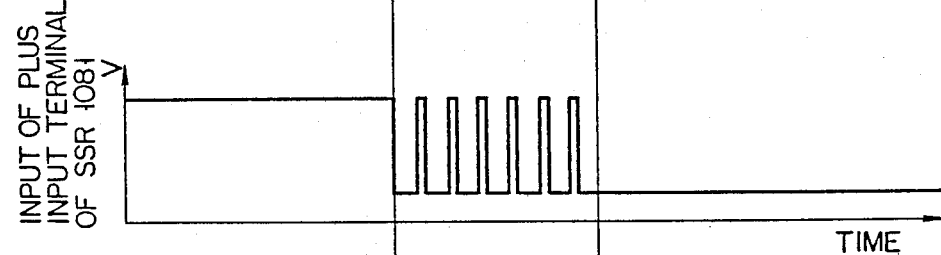
FIG. 16D is a timing chart showing the waveform of the input to a plus input terminal of an SSR 1081.

Assume that op amp 100a produces an output which indicates that the detected air quantity is greatly larger than the preset air quantity ("S"<<"D"), as shown in FIG. 16A. When the voltage of the signal from the op amp 100a exceeds the Zener voltage of the Zener diode 1069, the output from the op amp 100a is applied to bias the base of the Tr. 1067 through the diode 100f and the Zener diode 1069, thereby discharging the capacitor 1063. As a result, a high level signal appears at the output terminal 1061a of the IC 1061, as shown in FIG. 16C. The output terminal 1061a of the IC 1061 is connected to cathodes of the diodes 1085 and 1086 of the motor driving circuit 108. The motor driving circuit 108 comprises a solid state relay (to be referred to as an SSR hereinafter) 1081, an SSR 1082, resistors 1083 and 1084, and the diodes 1085 and 1086. Even if the high level signal from the output terminal 1061a is applied to the motor driving circuit 108, the diodes 1085 and 1086 disable the reverse flow of charge. Therefore, the motor driving circuit 108 is kept disabled.

Figure 16E:
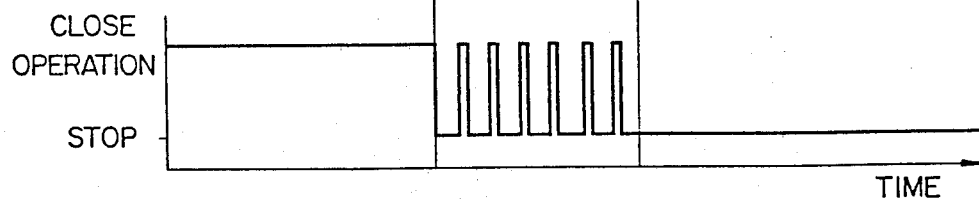
FIG. 16E is a timing chart showing the "close" operation of the motor, that is, the operation in which the throttle valve is closed upon rotation of a motor.

As shown in FIG. 16E, the motor 52 is driven to close the throttle valve 22. The output from the op amp 100a is decreased since the op amp 1011 produces the high level signal as shown in FIG. 16B. When the output voltage at the op amp 100a becomes lower than the Zener voltage of the Zener diode 1069, the Zener diode 1069 acts as a high impedance. The base of the Tr 1067 is not then biased and is grounded through the resistor 1068. As a result, the Tr. 1067 becomes a high impedance so as not to discharge energy of the capacitor 1063. As a result, the IC 1061 serves as an astable multivibrator by the function of the capacitor 1063, the diode 1064 and the resistors 1065 and 1066. As shown in FIG. 16C, the signals of high level and low level are alternately produced from the output terminal of the IC 1061.

As described above, when the output terminal of the IC 1061 is kept high, the driving motor circuit 108 is kept disabled. However, when the output terminal of the IC 1061 becomes low, the signal of high level to a plus input terminal 1081a of the SSR 1081 is supplied to the output terminal 1061a of the IC 1061 through the diode 1085. Accordingly, the plus input terminal 1081a of the SSR 1081 becomes low. In other words, a path between an AC input and output terminals 1081b and 1081c serves as a high impedance. As a result, the motor 52 does not perform the "close" operation. However, since the op amp 1011 continues to produce the high level signal through the resistor 1083, the SSR 1081 becomes a low impedance again when the output terminal 1061a of the IC 1061 becomes high. Thus, the motor 52 performs the "close" operation.

On the other hand, when the detected air quantity is equal to the preset air quantity, the op amp 1011 produces a signal of low level as shown in FIG. 16B, so that the "close operation" of the motor 52 is completely interrupted. Even in this condition, the high level signals and low level signals are alternately produced at the output terminal 1061a of the IC 1061. However, when the plus input terminal 1081a of the SSR 1081 is kept low, the signals from the IC 1061 have no effect on the IC 1061. In other words, the continuous and inching (fine) operations of the motor 52 are performed.

The "open" operation of the motor 52 is substantially the same as the "close" operation thereof, except that the op amp 100g is used in place of the op amp 100a, the detected air quantity is greatly smaller than the preset air quantity, the "open" operation is performed instead of the "close" operation, and the op amp 1012, the SSR 1082, the diode 1086, and the resistor 1084 are respectively used in place of the op amp 1011, the SSR 1081, the diode 1085, and the resistor 1083.

The inching operation has an advantage in that various transient problems such as a delay in response time of the revolution of the impeller 28 and an unstable time interval for the air flows can be eliminated. The above problems are caused by movement of the throttle valve 22 after it is temporarily stopped.

The motor driving circuit 108 will now be described. The output terminal of the op amp 1011 of the motor driving circuit 108 is connected to the plus input terminal 1081a of the SSR 1081 through the resistor 1083. The resistor 1083 serves as a limiter for a current flowing in the plus input terminal 1081a of the SSR 1081. The resistor 1083 also serves to protect the op amp 1011 when the plus input terminal 1081a of the SSR 1081 becomes low by operation of the fine control discriminator circuit 106 when the op amp 1011 is kept high.

The output terminal of the op amp 1012 is connected to a plus input terminal 1082a of the SSR 1182 through the resistor 1084. The resistor 1084 serves as a limiter for a current flowing in the plus input terminal 1082a of the SSR 1082. The resistor 1084 also serves to protect the op amp 1012 when the plus input terminal 1082a of the SSR 1082 becomes low due to operation of the fine control discriminator circuit 106 when the op amp 1012 is kept high.

The path between the AC input and output terminals 1081b and 1081c or between the AC input and output terminals 1082b and 1082c acts as a low impedance when the plus input terminals 1081a and 1082a of the SSR 1081 and 1082 receive signals of high level, thereby rotating the motor 52. However, the paths between the AC input and output terminals 1081b and 1081c and between the AC input and output terminals 1082b and 1082c respectively serve as high impedances when the plus input terminals 1081a and 1082a of the SSR 1081 and 1082 receive signals of low level, thereby stopping the motor 52. As may be apparent from the above description, the paths between the AC input and output terminals 1081b and 1081c and between the AC input output terminals 1082b and 1082c may not simultaneously serve as low impedances. Therefore, the "open" and "close" operations of the motor 52 are clearly distinguished.

The rocking position detector 70 will be described which comprises reed switches 701 and 702 and a magnet 74. Assume that the motor 52 performs a full "close" operation, that is, the motor 52 is operated to fully close the throttle valve 22. The magnet 74 causes the reed switch 701 to turn on in the following manner. Since the "close" operation mode is initiated, the op amp 1011 supplies the high level signal to the plus input terminal 1081a of the SSR 1081 through the resistor 1083. In this condition, when the reed switch 701 is turned on, the high level signal from the op amp 1011 is grounded through the resistor 1083. As a result, the plus input terminal 1081a of the SSR 1081 becomes low, so the path between the AC input and output terminals 1081b and 1081c of the SSR 1081 serves as a high impedance. As a result, the "close" operation of the motor is interrupted.

Assume that the motor 52 performs a full "open" operation, that is, the motor 52 is operated to fully open the throttle valve 22. The magnet 74 is operated to turn on the reed switch 702 in the following manner. Since the "open" mode is initiated, the op amp 1012 supplies a high level signal to the plus input terminal 1082a of the SSR 1082 through the resistor 1084. When the reed switch 702 is turned on, the high level signal from the op amp 1012 is grounded through the resistor 1084. The plus terminal 1082a of the SSR 1082 then becomes low, and the path between the AC input and output terminals 1082b and 1082c of the SSR 1082 serves as a high impedance. As a result, the "open" operation of the motor 52 is interrupted.

The motor 52 has a common terminal, a "close" operation terminal and an "open" operation terminal. When AC power is supplied between the common terminal and the "close" operation terminal, the motor 52 performs the "close" operation. However, when AC power is supplied between the common terminal and the "open" operation terminal, the motor 52 performs the "open" operation.

As described above, when a given air quantity is predetermined by the maximum air quantity setter 98, if the detected air quantity is decreased by air pressure, the detected air quantity will then be properly controlled to coincide with the preset air quantity by the maximum air quantity setter. Thus, the description of the constant air quantity function is completed.

The variable air quantity function will be described with reference to FIGS. 6 and 12.

In order to perform the variable air quantity function, the operating mode of the air quantity regulating apparatus must be determined, since the variable air quantity function must satisfy the conditions in the following table.

TABLE

| Detection State of Room Thermostat | Air Quantity Regulating Apparatus | |
|---|---|---|
| | Cooling | Heating |
| Detected Room Temp. = Preset Temp. | 50% blow of maximum air quantity | 50% blow of maximum air quantity |
| Detected Room Temp. << Preset Temp. | 0% blow of maximum air quantity | 100% blow of maximum air quantity |
| Detected Room Temp. >> Preset Temp. | 100% blow of maximum air quantity | 0% blow of maximum air quantity |

The signal from the room thermostat 90 must be inverted in accordance with the cooling or heating mode.

The variable air quantity operation will be described in detail.

A blast temperature must be detected by the blast temperature detector 80 to determine whether the cooling or heating mode is operating. The blast temperature detector 80 has a diode 801 and a resistor 802. A voltage $V_F$ (foward bias voltage) at the anode of the diode 801 is inversely proportional to the temperature. When the detected blast temperature is high, the voltage $V_F$ is low. However, when the detected blast temperature is low, the voltage $V_F$ is high.

The anode of the diode 801 is connected to the non-inverting input terminal of an op amp 821 of the amplifier circuit 82. The amplifier circuit 82 includes the op amp 821 which functions as a non-inverting amplifier and resistors 822 and 823. The op amp 821 amplifies the voltage $V_F$ which is then properly determined by the resistors 822 and 823. The output terminal of the op amp 821 is connected to the inverting input terminal of an op amp 841 of the air cooling/heating discriminator circuit 84. The air cooling/heating discriminator circuit 84 includes the op amp 841 and resistors 842 and 843. The working temperature setter 86 includes a variable resistor 861 and a resistor 862. The working temperature setter 86 is operated to change from the cooling mode to the heating mode and from the heating mode to the cooling mode. A resistance of the variable resistor 861 is changed to arbitrarily change the heating mode to the cooling mode and vice versa.

Figure 18A:
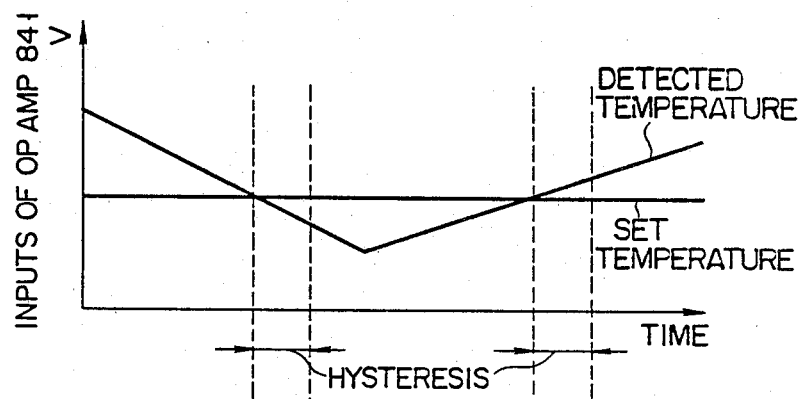
FIGS. 18A, 18B and 19 are graphs showing the hysteresis of an operational amplifier 841.
Figure 19:
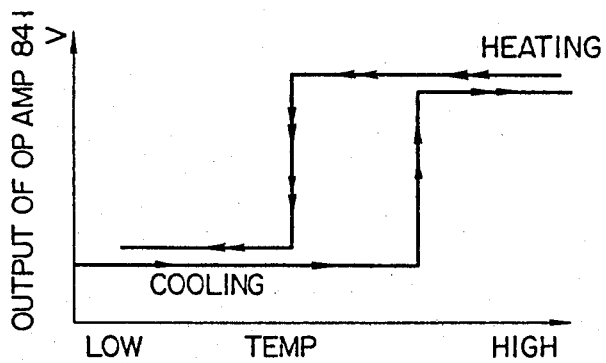

The air cooling/heating discriminator circuit 84 will now be described in detail. The op amp 841 acts as a comparator with hysteresis. A signal corresponding to the detected temperature is properly modified and is supplied to the inverting input terminal of the op amp 841. The signal from the working temperature setter 86 is supplied to the non-inverting input terminal of the op amp 841 through the resistor 843. In the op amp 841 which functions as a comparator with hysteresis using the resistors 842 and 843, when the level of the signal from the working temperature setter 86 is higher or lower than that from the op amp 821 in the amplifier circuit 82 as shown in FIG. 18A, the negative-going edge of the signal from the amplifier 841 differs from the positive-going edge of the signal therefrom by the function of the resistors 842 and 843. In other words, a change in blast temperature is detected with hysteresis, as shown in FIG. 19.

The above operation will be further described in detail. The cooling mode is clearly distinguished from the heating mode in the following manner. Based upon the assumption that the temperature is represented by a voltage, when the output voltage from the op amp 821 is lower than the voltage preset by the working temperature setter 86, that is, when the blast temperature is higher than the preset temperature, it is determined that the heating mode is set. The op amp 841 then produces a high level output. In the inverse condition, the op amp 841 produces a low level output.

The hysteresis in a change in mode from heating to cooling and vice versa provides the following advantage; the blast temperature is not regarded as constant, but is changed within a given deviation range. If the working temperature is set at an intermediate position of the deviation range, heating and cooling are alternately repeated, thus disabling the control. The temperature deviation range provided by the hysteresis must be determined by experience and working conditions. By this hysteresis, the controllable ranges in cooling and heating are widened, and stable air conditioning can be performed.

A case will first be described in which the cooling mode is set. In this cooling mode, the low level signal appears at the ouput terminal of the op amp 841. This output is supplied to one input terminal of an exclusive OR gate 881 of the signal inversion discriminator circuit 88. A DC signal of high level is directly supplied from the DC power source to the other input terminal of the exclusive OR gate 881. As a result, the two input terminals of the exclusive OR gate 881 respectively go high and low, so that the exclusive OR gate 881 produces a high level signal. This output signal is supplied to one input terminal of an exclusive OR gate 941 of the signal discriminator circuit 94 through the resistor 943. The signal discriminator circuit 94 comprises the exclusive OR gate 941, a diode 942, and the resistor 943.

Meanwhile, the room thermostat 90 produces the signal indicating a difference between room temperature and the preset temperature independently of the mode of operation. This signal from the room thermostat 90 is supplied to a resistor 922 of the thermo signal discriminator circuit 92. The thermo signal discriminator circuit 92 has a Tr. 921 and the resistors 922 and 923.

When an actual room temperature is greatly higher than the preset temperature, only the signal component of high level is supplied to the base of the Tr. 921 through the resistor 922, so the Tr. 921 acts as a low impedance. As a result, the low level signal is supplied to the other input terminal of the exclusive OR gate 941. The two input terminals of the exclusive OR gate 941 are respectively thus kept high and low, so that the exclusive OR gate 941 produces a high level signal. This high level signal is applied to the capacitor 951 through the diode 942 to fully charge the capacitor 951. As a result, the signal is applied across the variable resistor 981 in the maximum air quantity setter 98, and the maximum air quantity currently used is updated. Thereafter, the detected air quantity is controlled to coincide with the updated maximum air quantity in accordance with aforesaid constant air quantity control.

Assume that an actual room temperature is equal to the preset temperature. The high level and low level signals are alternately supplied to the base of the Tr. 921 through the resistor 922. The base of the Tr. 921 is grounded when the low level signal is applied thereto, so that the Tr. 921 acts as a high impedance. However, when the high level signal is applied to the base of the Tr. 921, the Tr. 921 acts as a low impedance. As a result, the other input terminal of the exclusive OR gate 941 alternately goes high and low. On the other hand, the one input terminal of the exclusive OR gate 941 is kept high in the cooling mode. Accordingly, the exclusive OR gate 941 alternately produces signals of high level and low level so as to charge the capacitor 951 through the diode 942. Since high level and low level are repeated at a 50% duty cycle, the charge of the capacitor 951 is halved. The air quantity specified by the maximum air quantity setter is decreased to 50% of that specified by the high level signal. In this manner, when the actual room temperature is equal to the preset temperature, 50% blow of the maximum air quantity can be performed. The diode 942 is arranged to disable the reverse flow of charge from the capacitor 951 therethrough when the exclusive OR gate 941 becomes low.

Assume that an actual room temperature is greatly lower than the preset temperature. Only the signal component of low level is produced by the room thermostat 90. The base of the Tr. 921 is grounded through the resistor 923, so that the Tr. 921 acts as a high impedance. As a result, the two input terminals of the exclusive OR gate 941 become high, so that the output terminal thereof becomes low, thus disabling charging of the capacitor 951. The air quantity specified by the maximum air quantity setter corresponds to 0% blow so as to control the motor 52 to set the detected air quantity to be 0% blow.

However, a given signal is supplied from the variable resistor 961 of the minimum air ventilating quantity setter 96 to the capacitor 951 through the diode 962. The detected air quantity is regulated to be an air quantity indicated by the given signal. In other words, a variable air quantity can be obtained in accordance with a change in resistance of the variable resistor 961. The diode 962 is arranged to disable the reverse flow of charge from the capacitor 951 therethrough.

An illustration of the heating mode will now be given. In this heating mode, the output terminal of the op amp 841 is kept high. The high level signal from the op amp 841 is supplied to the one input terminal of the exclusive OR gate 881 which constitutes the signal invertion discriminator circuit 88. The high level signal is directly supplied from the DC power source to the other input terminal of the exclusive OR gate 881. As a result, the high level signals are supplied to the two input terminals of the exclusive OR gate 881, so that the exclusive OR gate 881 produces a signal of low level. In this manner, the signal which has the opposite level to that of the signal in the cooling mode is produced in the heating mode. The low level output signal is then supplied from the exclusive OR gate 881 to the one input terminal of the exclusive OR gate 941 of the signal discriminator circuit 94 through the resistor 943.

When an actual room temperature is greatly higher than the preset temperature, only the high level signal component is supplied from the room thermostat 90 to the base of the Tr. 921 through the resistor 922. The base of the Tr. 921 is then biased, and the Tr. 921 acts as a low impedance. As a result, the low level signal is supplied to the one input terminal of the exclusive OR gate 941. Since the two input terminals of the exclusive OR gate 941 become low, the exclusive OR gate 941 produces a low level signal. This low level signal is then supplied to the capacitor 951 through the diode 942. However, this signal is set at a low level, so that it is unable to charge the capacitor 951. This leads to the same blowing condition (i.e., 0% blow), as when the actual room temperature is greatly lower than the preset temperature in the cooling mode.

When an actual room temperature is equal to the preset temperature, in the same manner as described with reference to the cooling mode, the other input terminal of the exclusive OR gate 941 is alternately set at high and low levels. The one input terminal of the exclusive OR gate 941 is kept low in the heating mode. Therefore, the exclusive OR gate 941 alternately produces signals of high and low levels. These signals are supplied to the capacitor 951 through the diodes 942. It is noted that the signals of high and low levels are produced at a 50% duty cycle. Therefore, the amount of charge of the capacitor 951 is halved in comparison with a case where only the signals of high level are supplied to the capacitor 951. This amount of charge is the same as the case where the actual room temperature is the same as the preset temperature in the cooling mode. As a result, 50% blow of the maximum air quantity can be performed.

When an actual room temperature is greatly lower than the preset temperature, only the low level signal component is produced by the room thermostat 90. In other words, the high level signal is supplied to the other input terminal of the exclusive OR gate 941, whereas the low level signal is supplied to the one input terminal thereof since the heating mode is currently set. As a result, the output from the exclusive OR gate 941 becomes high to fully charge the capacitor 951. Thus, 100% blow is performed in the same manner as in the case where the actual temperature is greatly higher than the preset temperature in the cooling mode.

Thus, the variable air quantity control is properly performed in the cooling and heating modes in which the room temperature accurately coincides with the preset temperature.

Figure 20:
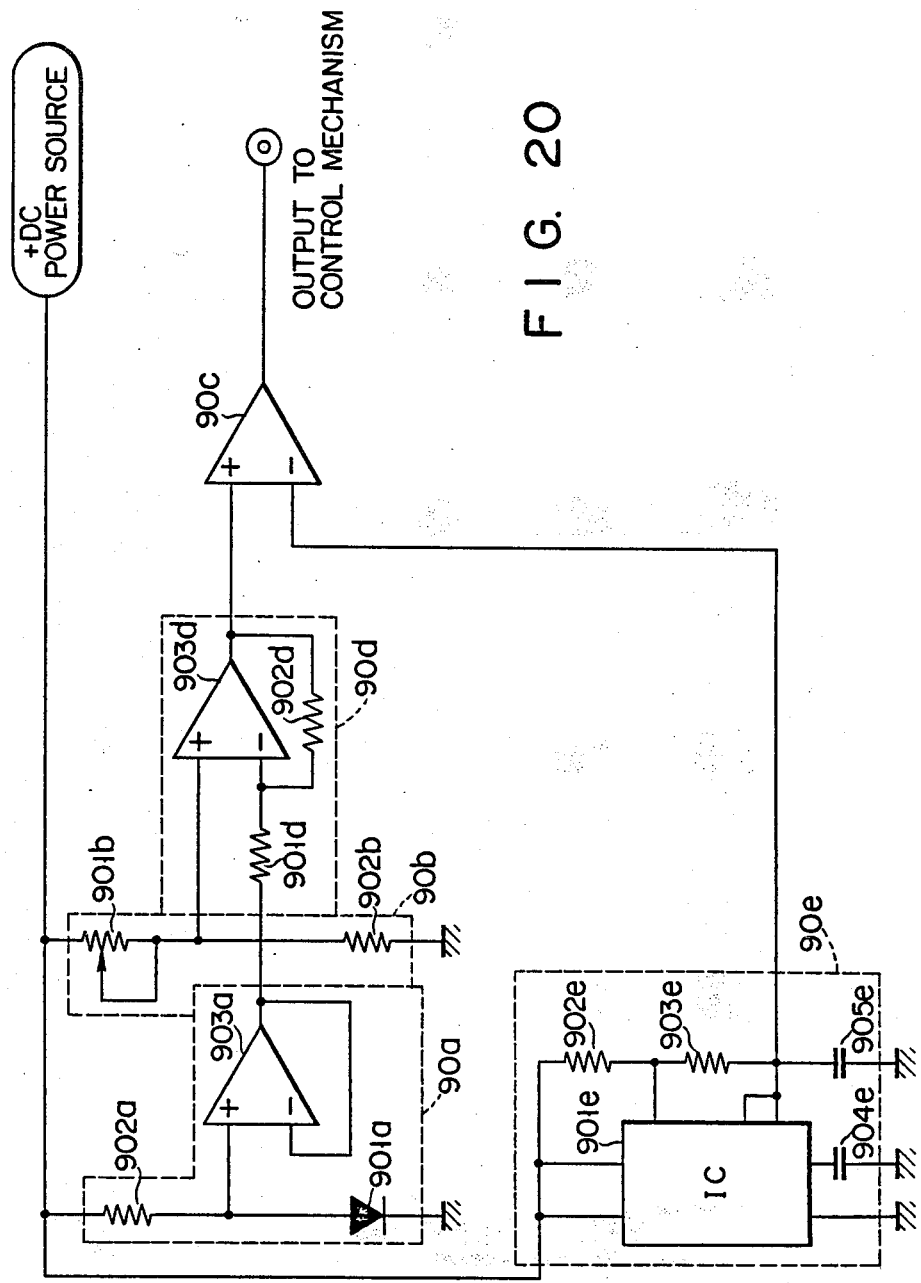
FIG. 20 is a working circuit diagram of a room thermostat.

The structure and operation of the room thermostat 90 will be described with reference to FIGS. 20 to 26B. As shown in FIG. 20, in the room thermostat 90, the room temperature detector 90a has a diode 901a, a resistor 902a and an op amp 903a; the room temperature setter 90b has a variable resistor 901b and a resistor 902b; the differential amplifier 90d has resistors 901d and 902d and an op amp 903d; the comparator 90c comprises an op amp; and the reference ramp wave generator 90e has an IC 901e called a function block, resistors 902e and 903e and capacitors 904e and 905e.

The diode 901a of the room temperature detector 90a which is combined together with the resistor 902b detects an actual room temperature. Specifically, since a current which is limited by the resistor 902a flows from the DC power source to the diode 901a, the voltage $V_F$ (forward bias voltage), that is, the anode voltage of the diode 901a is inversely proportional to the temperature. Thus, a change in the voltage $V_F$ at the diode 901a can be quantitatively translated into a temperature change.

Since the op amp 903a functions as a voltage follower, it can amplify the voltage signal without influencing the voltage $V_F$ at the diode 901a. The output terminal of the op amp 903a is connected to the inverting input terminal of the op amp 903d through the resistor 901d. The non-inverting input terminal of the op amp 903d receives a voltage obtained by dividing the voltage from the DC power source by means of the variable resistor 901b and the resistor 902b. By the voltage-division of the variable resistor 901b and the resistor 902b, the voltage supplied to the non-inverting input terminal of the op amp 903d can be changed, thereby serving as the room temperature setter. In other words, the room temperature setter provides a predetermined function by changing the resistance of the variable resistor 901b.

The op amplifier 903d functions as a differential amplifier when it is operated together with the resistors 901d and 902d. The output terminal of the op amp 903d is connected to one input terminal of the comparator 90c to be described in detail later. When the detected temperature is equal to the preset temperature, the op amp 903d generates the signal by which the comparator 90c performs 50% duty cycle oscillation with the resistors 901d and 902d. More specifically, when the actual room temperature is higher than the preset temperature, the op amp 903d produces a high-voltage signal. However, when the actual room temperature is lower than the preset temperature, the op amp 903d produces a low-voltage signal. A difference between the actual room temperature and the preset temperature is converted by the op amp 90c to a difference in the pulse width during one cycle and is produced as a signal having a given pulse width.

Figure 21:
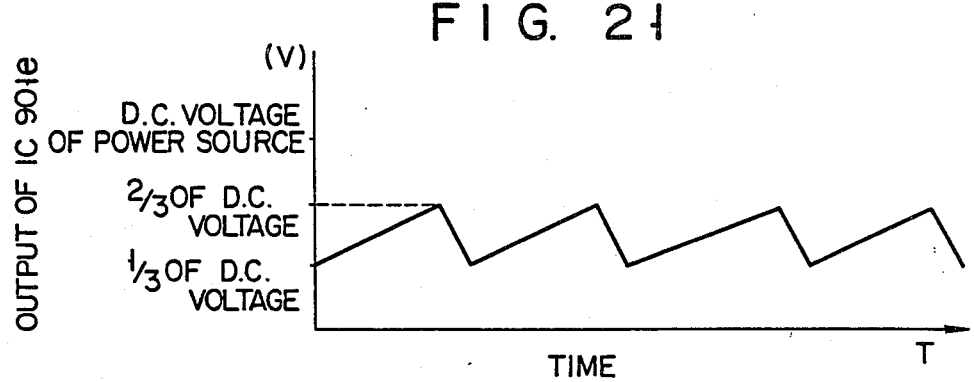
FIG. 21 is a timing chart showing the waveform of the output from an IC 901e.

The function of the reference ramp wave generator 90e will now be described. The IC 901e constantly supplies a signal with a waveform shown in FIG. 21 to the op amp 90c as a comparator by the function of the resistors 902e and 903e and the capacitor 905e. The capacitor 904e is arranged to stabilize the IC 901e. A signal corresponding to a difference between the highest and lowest peaks of the ramp wave shown in FIG. 21 is supplied to the other input terminal of the op amp 90c as a comparator. The difference corresponds to a proportional control range.

Figure 22A:
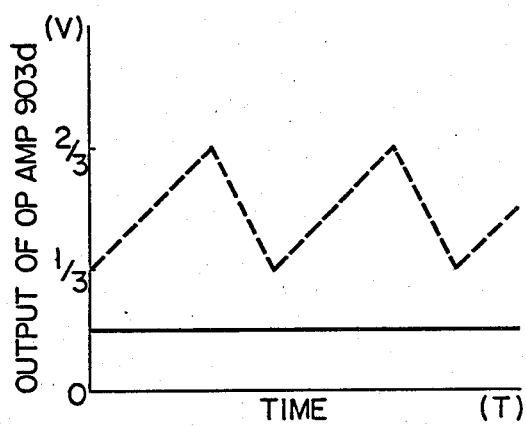
FIGS. 22A, 23A, 24A, 25A and 26A are timing charts showing the waveforms of the outputs from an operational amplifier 903d.
Figure 22B:
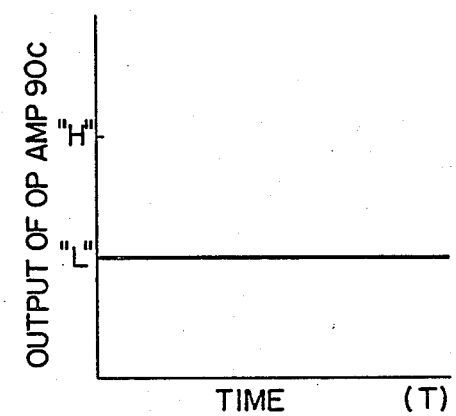
FIGS. 22B, 23B, 24B, 25B and 26B are timing charts showing the waveforms of the outputs from an operational amplifier 90c.
Figure 23A:
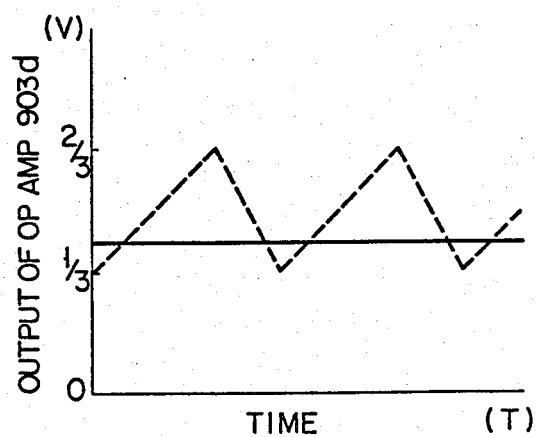
Figure 23B:
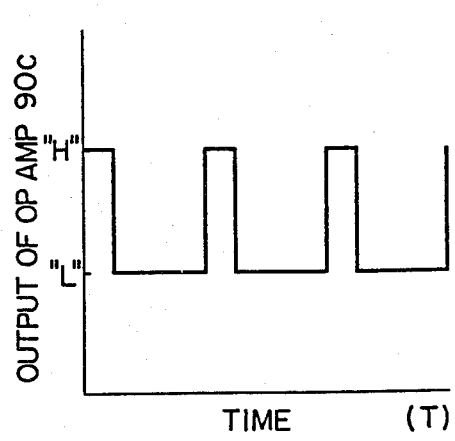

In the room thermostat 90 arranged as described above, the following control operations are performed. When the detected room temperature is greatly lower than the preset temperature, the output level of the signal from the op amp 903d is lower than the lowest peak of the ramp wave, as shown in FIG. 22A. Therefore, the low level signal is constantly produced by the op amp 90c, as shown in FIG. 22B. When the detected temperature is slightly lower than the preset temperature, the output level of the signal from the op amp 903d is positioned to the inner lower portion of the ramp wave, as shown in FIG. 23A. The pulse width of the high level signal from the op amp 90c is shorter than that of the low level signal therefrom, as shown in FIG.

Figure 24A:
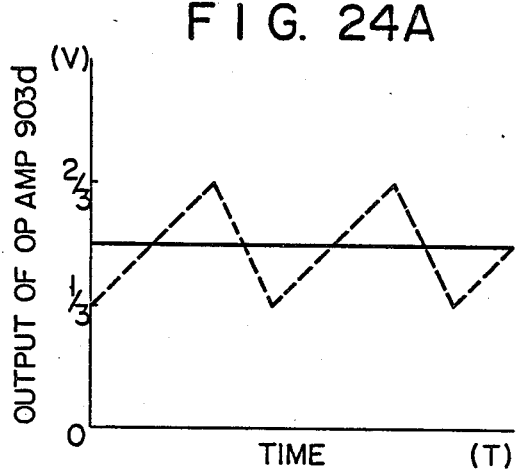
Figure 24B:
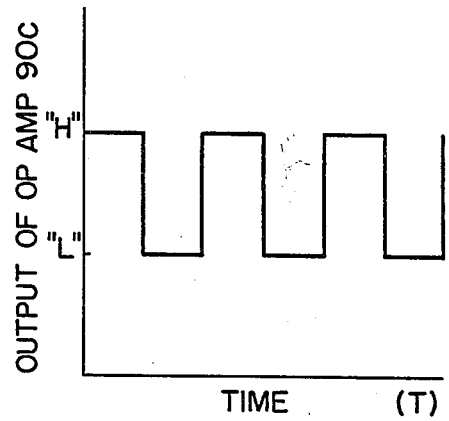

23B. When the detected room temperature is equal to the preset temperature, the output level of the signal from the op amp 903d corresponds to a medial point of the ramp wave, as shown in FIG. 24A. The output from the op amp 90c thus has a 50% duty. In other words, the magnitude of the signal component of high level is the same as that of the signal component of low level.

Figure 25A:
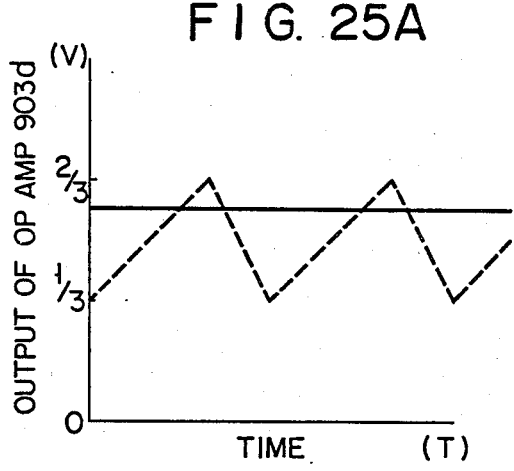
Figure 25B:
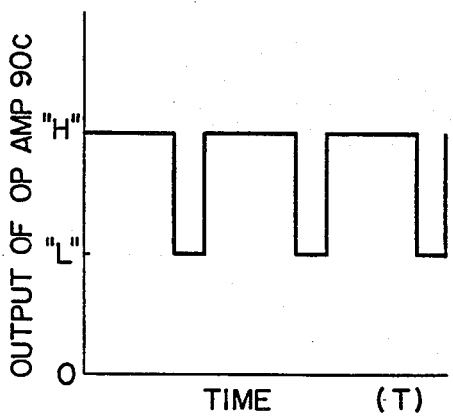
Figure 26A:
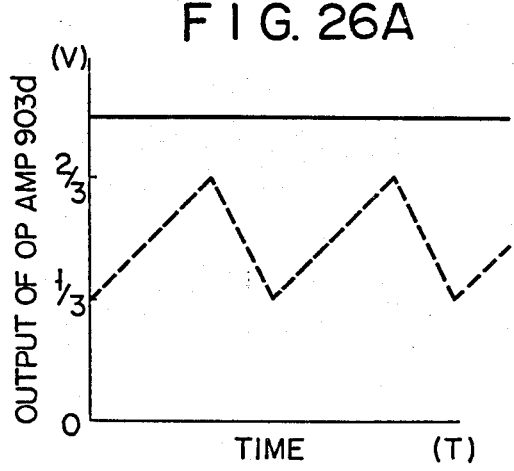
Figure 26B:
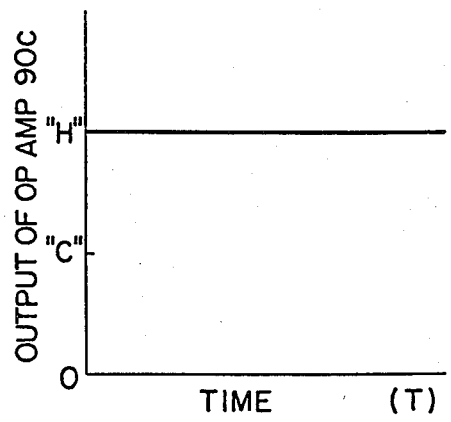

When the detected room temperature is slightly higher than the preset temperature, the output level of the signal from the op amp 903d is positioned to the upper inner position of the ramp wave, as shown in FIG. 25A. Therefore, in the output from the op amp 90c, the magnitude of the signal component of high level is greater than that of the signal component of low level. When the detected room temperature is greatly higher than the present temperature, the output level of the signal from the op amp 903d is higher than the highest peak of the ramp wave. Therefore, the op amp 90c constantly produces a high level signal, as shown in FIG. 26B. Thus, as described above with reference to timing charts, 50% duty cycle oscillation is performed when the detected room temperature is equal to the present temperature. If either the detected room temperature or the present temperature is higher (or lower) than the other, a pulse width for one cycle is proportionally increased to produce a signal having a corresponding pulse width.

Now there will be described the operation of the air quantity regulating apparatus of the above-mentioned construction.

First, a desired maximum air quantity is set by the maximum air quantity setter 98. The motor reversal discriminator circuit 100 compares the maximum air quantity information set by the setter 98 with air quantity information detected by the air quantity detector 16, and checks the amount of flow throttled by the throttle valve 22 for excess or deficiency. On the basis of the results of this check, the motor driving circuit 108 produces an output signal indicating the rotating direction (forward or reverse) of the motor 52. If it is concluded that the detected air quantity is smaller than the preset maximum air quantity, the motor reversal discriminator circuit 100 rotates the motor 52 in one direction to cause the throttle valve 22 to open the passage. If it is found that the detected air quantity is greater than the preset maximum air quantity, on the other hand, the motor reversal discriminator circuit 100 rotates the motor 52 in the other direction to cause the throttle valve 22 to close the passage. Such rotation is continued until the detected air quantity coincides with the preset air quantity, and thus the air quantity is always maintained at the maximum value set by the setter 98.

In order to obtain an air quantity corresponding to a temperature load in a room, on the other hand, the room thermostat 90 is actuated. In the room thermostat 90, a desired room temperature is set by the room temperature setter 90b. Then, the room temperature detector 90a detects an actual room temperature, and the comparator 90c compares the detected temperature with the preset temperature, converts the resultant temperature difference information into a digital signal as a thermo signal, and delivers the thermo signal to the thermo-signal discriminator circuit 92.

Hereupon, the blast temperatures for air-cooling and heating are previously set in the working temperature setter 86. Then, the air cooling/heating discriminator circuit 84 compares the temperature detected by the blast temperature detector 80 with the two working temperatures set by the working temperature setter 86, thereby discriminating the operation state (air-cooling or heating) of the air quantity regulating apparatus. As a result of such discrimination, the signal inversion discriminator circuit 88 inverts the thermo signal as required to obtain a thermo signal suited for air-cooling or heating, and delivers it to the signal discriminator circuit 94. Thereafter, the throttle valve 22 is rocked in accordance with the aforementioned procedure.

Thus, the quantity of air flowing through the duct member 10 may be maintained at a desired set value by controllably rocking the throttle valve 22.

By actuating the room thermostat 90, moreover, the air quantity may be adjusted to a value corresponding to the load inside a room so that a desired preset room temperature may be maintained.

That is, the air quantity regulating apparatus of this invention can provide what is called the constant air quantity control function whereby the air quantity for each communicating room may be maintained at a preset value without regard to any charge in air quantity or pressure in other rooms.

Furnished with the room thermostat 90, moreover, the air quantity regulating apparatus of the invention can provide what is called the variable air quantity control function for air quantity control responsive to the load in each room, whereby the air quantity or room temperature may be adjusted for each individual room.

Figure 18B:
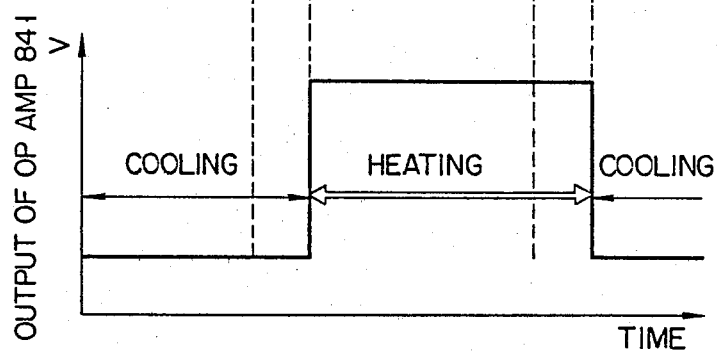

Further, the air quantity detector 16 is provided with the impeller 28 which rotates substantially in direct proportion to the air flow speed through the duct member 10, as shown in FIG. 7, the impeller 28 being supported so as to be able to rotate in a substantially no-load state with the aid of the bearing portions 30. Therefore, only a slight air speed is required to start the rotation of the impeller 28 for detection, and the throttle valve 22 can be controlled by a pressure only high enough to maintain the air speed or air quantity. In this embodiment, the minimum working pressure required when the maximum quantity of air is flowing, that is, when the air quantity regulating apparatus is operating with the maximum of efficiency, is 2 mmAq, as indicated by a solid line in FIG. 18. This value is considerably smaller than the value of the minimum working pressure of the prior art apparatus as indicated by a broken line in FIG. 8. Thus, according to the apparatus of this invention, the pressure loss is minimized to ensure stable air quantity control.

It is to be understood that this invention is not limited to the above-mentioned embodiment, and that various changes and modifications may be effected therein by one skilled in the art without departing from the scope or spirit of the invention.

Instead of using the magnetic resistance element, for example, a Hall element, Hall I.C., coil or reed switch may be used for the revolution sensor 32 for detecting the number of revolutions of the impeller 28. It is only necessary that the sensor be able to detect the polar change due to rotation in a no-contact state. Although a four-poled rubber magnet is used for the rubber magnet 42 as a detecting element in the above embodiment, the magnet need only be provided with at least one pole. The more magnet poles, the higher the detecting accuracy will be. The diode of the blast temperature detector 80 or the room temperature detector 90a is replaceable to a thermistor for temperature measurement or resistance bulbs such as a Pt sensor.

Further, the driving mechanism 24 is not limited to the illustrated one, and may be any other suitable mechanism which can open and close the throttle valve 22 under the control of the control mechanism 20.

Figure 9:
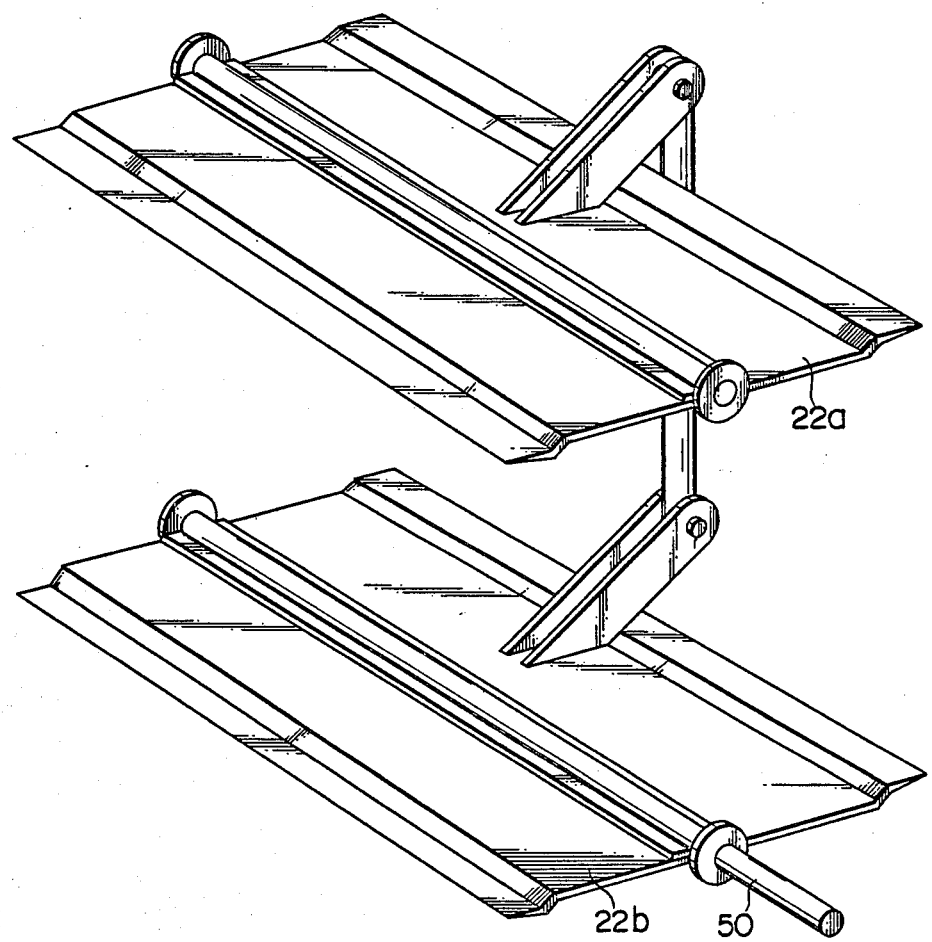
FIG. 9 is a perspective view showing another embodiment of the air quantity regulating apparatus according to the present invention.
Figure 10:
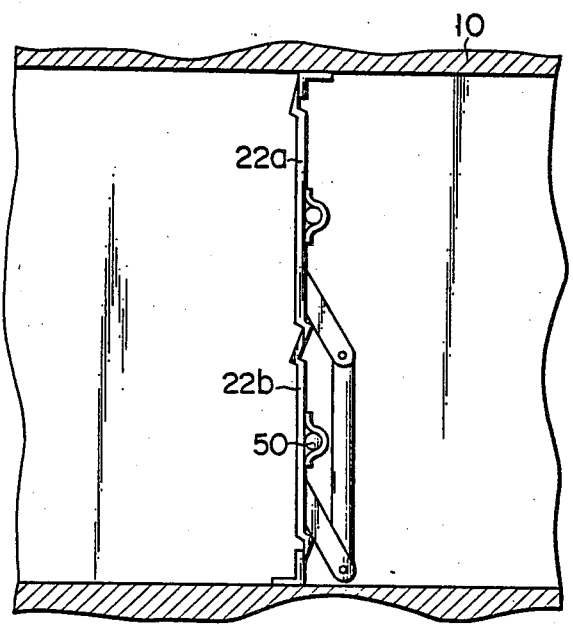
FIGS. 10 and 11 are front views showing different operating states of a throttle plates shown in FIG. 9.
Figure 11:
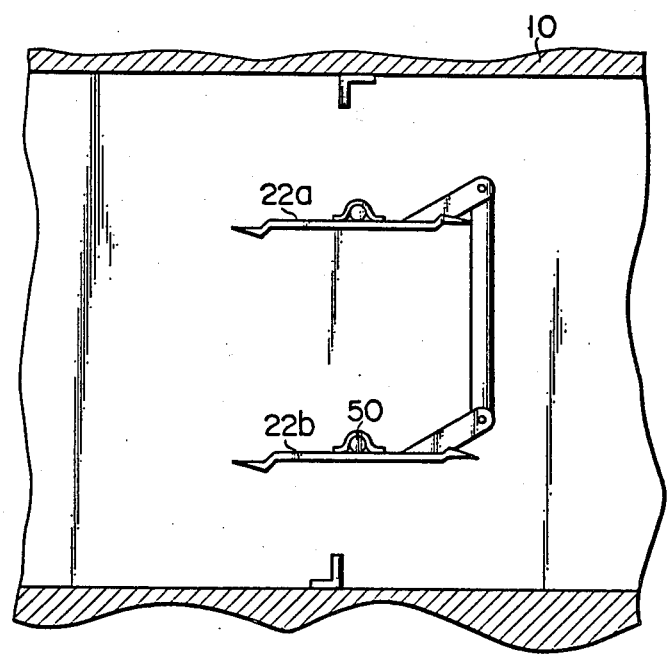

Furthermore, the throttle valve 22, which rocks to open and close and passage in the duct member 10 for the flow control, may be replaced with a throttle valve which opens and closed the passage by linear motions. Although a single throttle valve 22 is used in the above-mentioned embodiment, the number of throttle valves may be set freely. In another embodiment of the invention as shown in FIGS. 9 to 11, for example, two throttle valves 22a and 22b are used for the flow control. The control performance will be improved as the throttle valves increase in number.

Additionally, the impeller 28 may be of a water turbine type, for example, instead of being of the propeller type as illustrated.

What we claim is:

1. An air quantity regulating apparatus for air conditioning, which is used in a system for supplying air from an air conditioner to a plurality of zones to be air-conditioned through a duct so as to regulate an air-quantity supplied to each of the plurality of zones at a predetermined quantity regardless of a difference between pressures at different locations in the duct and a change in pressure at a signal location in the duct, comprising:
   (a) a duct member which is disposed in the duct to supply the air from the air conditioner to the zone to be air-conditioned;
   (b) an air quantity detector which is disposed in an air flow in said duct member to measure the quantity of air flowing from the air conditioner and which includes a rotary member rotated at a rotational frequency proportional to an air speed and a rotational frequency detector for detecting the rotational frequency of said rotary member;
   (c) a throttle valve mechanism which is diposed downstream of said air quantity detector in said duct member to control the quantity of air flowing in said duct member;
   (d) a driving means which is reversibly operated to drive said throttle valve mechanism;
   (e) an air quantity setter which sets the quantity of air flowing in said duct member; and
   (f) a control means for controlling said driving means to make a preset air quantity set by said air quantity setter coincide with a detected air quantity detected by said air quantity detector.

2. The apparatus according to claim 1, wherein said throttle valve mechanism has a throttle plate which is free to pivot, which is disposed to extend across the air flowing in said duct member and which is supported by said duct member.

3. The apparatus according to claim 2, further comprising movement range regulating means for regulating a pivotal range of said throttle plate so that said throttle plate may not pivot exceeding a fully open position thereof.

4. The apparatus according to claim 1, wherein said throttle valve mechanism has a plurality of throttle plates which are free to pivot, which are disposed across a direction of the air flowing in said duct member, and which are supported by said duct member.

5. The apparatus according to claim 4, further comprising movement range regulating means for regulating a pivotal range of said plurality of throttle plates so that said plurality of throttle plates may not pivot exceeding fully open positions thereof.

6. The apparatus according to claim 1, wherein said driving means includes a reversible motor which drives said throttle valve mechanism.

7. The apparatus according to claim 1, further comprising a room thermostat disposed in the zone to be air-conditioned so as to control the room temperature of the zone and a thermo signal discriminating means for receiving the thermo signal from said room thermostat to regulate the quantity of air, and wherein said control means has a signal discriminating means for producing a signal corresponding to a required air quantity in proportion to the thermo signal from said room thermostat, the required air quantity being below the air quantity set by said air quantity setter as a maximum air quantity, and said control means controls said driving means to make the necessary air quantity coincide the detected air quantity.

8. The apparatus according to claim 7, wherein said control means includes a blast temperature detector disposed in an air flow in said duct member to measure a temperature of the air flow and a working temperature setter for setting a changeover temperature of cooling and heating modes of the air quantity regulating apparatus.

9. The apparatus according to claim 7, wherein said control means has a minimum air quantity setter which has priority over the thermo signal to set a minimum quantity of air flowing in said duct member so as to guarantee a minimum ventilating quantity.

* * * * *